United States Patent
Kumar et al.

(10) Patent No.: US 12,477,483 B2
(45) Date of Patent: Nov. 18, 2025

(54) COHERENT UPLINK MIMO

(71) Applicant: QUALCOMM Incorporated, San Diego, CA (US)

(72) Inventors: Akash Kumar, Hyderabad (IN); Eswar Venkata Narasimha Muthyala Prasad Bahadursha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 18/360,600

(22) Filed: Jul. 27, 2023

(65) Prior Publication Data

US 2025/0039807 A1 Jan. 30, 2025

(51) Int. Cl.
*H04W 52/42* (2009.01)
*H04W 52/24* (2009.01)

(52) U.S. Cl.
CPC ........... *H04W 52/42* (2013.01); *H04W 52/24* (2013.01)

(58) Field of Classification Search
CPC ..... H04W 52/04; H04W 52/18; H04W 52/38; H04W 52/42; H04W 52/24; H04W 52/241–247; H04W 52/30; H04W 52/36; H04W 52/367
See application file for complete search history.

(56) References Cited

U.S. PATENT DOCUMENTS

| | | | | |
|---|---|---|---|---|
| 5,715,526 A | * | 2/1998 | Weaver, Jr. | H04W 52/343 455/126 |
| 6,798,843 B1 | * | 9/2004 | Wright | H03F 1/3247 330/149 |
| 7,327,802 B2 | * | 2/2008 | Sanders | H04B 1/525 375/296 |
| 9,219,594 B2 | * | 12/2015 | Khlat | H04L 5/001 |
| 9,379,785 B2 | * | 6/2016 | Shameli | H04B 5/48 |
| 9,634,697 B2 | * | 4/2017 | Natesan | H04B 1/40 |
| 9,660,687 B2 | * | 5/2017 | Ellä | H04B 1/40 |
| 9,941,708 B2 | * | 4/2018 | Keeling | B60L 53/30 |
| 10,098,088 B1 | * | 10/2018 | Kumar | H04W 64/006 |
| 10,139,238 B2 | * | 11/2018 | Widmer | G01C 21/3635 |
| 10,573,950 B2 | * | 2/2020 | Cheng | H04W 88/06 |
| 10,608,598 B2 | * | 3/2020 | Wang | H01P 5/18 |
| 11,051,252 B2 | * | 6/2021 | Mofidi | H04W 52/50 |
| 11,258,646 B2 | * | 2/2022 | Zach | H04J 11/0056 |
| 11,342,973 B1 | * | 5/2022 | Aldalbahi | H04B 7/0473 |
| 11,546,860 B2 | * | 1/2023 | Kumar | H04W 52/288 |
| 11,609,247 B2 | * | 3/2023 | Wang | H04B 1/04 |
| 11,622,288 B2 | * | 4/2023 | Raghavan | H04B 7/063 375/267 |

(Continued)

*Primary Examiner* — James M Perez
(74) *Attorney, Agent, or Firm* — Holland & Hart LLP

(57) ABSTRACT

Methods, systems, and devices for wireless communications are described. A user equipment (UE) may measure a first amount of reflected power associated with a first antenna of the UE and measure a second amount of reflected power associated with a second antenna of the UE. The UE may adjust an input power for the first antenna based at least in part on the first amount of reflected power or the second amount of reflected power and may perform a transmission via the first antenna using the adjusted input power for the first antenna. For example, the UE may increase the input power for the first antenna by an amount that is based at least in part on the first amount of reflected power.

30 Claims, 10 Drawing Sheets

(56) References Cited

U.S. PATENT DOCUMENTS

| | | | | |
|---|---|---|---|---|
| 11,716,643 | B2* | 8/2023 | Kumar | H04W 52/146 |
| | | | | 370/252 |
| 11,804,865 | B2* | 10/2023 | Lee | H04B 1/0458 |
| 11,901,973 | B2* | 2/2024 | Avasarala | H04B 7/0413 |
| 11,909,495 | B2* | 2/2024 | Kumar | H04B 15/00 |
| 11,914,050 | B2* | 2/2024 | Iyengar | H01Q 9/42 |
| 12,074,648 | B2* | 8/2024 | Spits | H04B 17/12 |
| 12,250,029 | B2* | 3/2025 | See | H04B 17/12 |
| 2004/0198261 | A1* | 10/2004 | Xiong | H04B 17/13 |
| | | | | 455/127.1 |
| 2005/0084003 | A1* | 4/2005 | Duron | H04B 1/525 |
| | | | | 375/221 |
| 2007/0270174 | A1* | 11/2007 | Heinonen | H04B 17/318 |
| | | | | 455/522 |
| 2008/0267056 | A1* | 10/2008 | Aryanfar | H04B 17/101 |
| | | | | 455/67.11 |
| 2009/0284082 | A1* | 11/2009 | Mohammadian | H04B 5/48 |
| | | | | 307/104 |
| 2011/0105045 | A1* | 5/2011 | Tanaka | H04W 72/046 |
| | | | | 455/67.11 |
| 2011/0116404 | A1* | 5/2011 | Shimizu | H01Q 1/521 |
| | | | | 370/252 |
| 2012/0094623 | A1* | 4/2012 | Khlat | H04B 1/18 |
| | | | | 455/150.1 |
| 2013/0050056 | A1* | 2/2013 | Lee | H01Q 3/30 |
| | | | | 343/893 |
| 2013/0194054 | A1* | 8/2013 | Presti | H04B 1/0458 |
| | | | | 333/32 |
| 2013/0207741 | A1* | 8/2013 | Presti | H03H 7/48 |
| | | | | 333/111 |
| 2013/0260844 | A1* | 10/2013 | Rucki | H01Q 3/2605 |
| | | | | 455/575.7 |
| 2013/0324057 | A1* | 12/2013 | Zhang | H03H 7/40 |
| | | | | 455/77 |
| 2013/0331042 | A1* | 12/2013 | See | H04W 52/367 |
| | | | | 455/77 |
| 2014/0227981 | A1* | 8/2014 | Pecen | H04B 1/0458 |
| | | | | 455/77 |
| 2015/0035545 | A1* | 2/2015 | Langer | G01R 21/00 |
| | | | | 324/629 |
| 2015/0042412 | A1* | 2/2015 | Imbornone | H01P 5/18 |
| | | | | 333/112 |
| 2015/0118981 | A1* | 4/2015 | Gao | H04B 17/103 |
| | | | | 455/115.1 |
| 2015/0162944 | A1* | 6/2015 | Peter | H04B 17/103 |
| | | | | 455/73 |
| 2015/0230263 | A1* | 8/2015 | Roy | H04W 24/08 |
| | | | | 455/452.2 |
| 2015/0318610 | A1* | 11/2015 | Lee | H01Q 3/34 |
| | | | | 375/267 |
| 2017/0230066 | A1* | 8/2017 | Little | H04B 1/401 |
| 2017/0244451 | A1* | 8/2017 | Raghavan | H04L 7/04 |
| 2017/0264010 | A1* | 9/2017 | Shi | H04B 1/18 |
| 2017/0295547 | A1* | 10/2017 | Langer | H03F 3/24 |
| 2017/0346178 | A1* | 11/2017 | Shi | H04B 17/12 |
| 2018/0054832 | A1* | 2/2018 | Luo | H04W 52/42 |
| 2018/0145742 | A1* | 5/2018 | Li | H04B 7/0874 |
| 2018/0263025 | A1* | 9/2018 | Kim | H04W 84/00 |
| 2018/0278318 | A1* | 9/2018 | Chakraborty | H04B 7/0404 |
| 2018/0351229 | A1* | 12/2018 | Kim | H04B 17/102 |
| 2018/0358686 | A1* | 12/2018 | Park | H01Q 21/08 |
| 2019/0037423 | A1* | 1/2019 | Yu | H04B 7/06952 |
| 2019/0159129 | A1* | 5/2019 | Choi | H04B 1/40 |
| 2019/0222279 | A1* | 7/2019 | Xi | H04B 7/063 |
| 2019/0373559 | A1* | 12/2019 | Davydov | H04W 52/42 |
| 2020/0169967 | A1* | 5/2020 | Yu | H04W 24/08 |
| 2020/0267662 | A1* | 8/2020 | Godala | H04W 52/367 |
| 2021/0068077 | A1* | 3/2021 | Raghavan | H04B 7/0404 |
| 2021/0126697 | A1* | 4/2021 | Kumar | H04B 7/0691 |
| 2021/0204346 | A1* | 7/2021 | Ye | H04W 76/19 |
| 2021/0266209 | A1* | 8/2021 | Zach | H04W 88/14 |
| 2022/0109490 | A1* | 4/2022 | Ma | H04W 72/20 |
| 2022/0109498 | A1* | 4/2022 | Vaez-Ghaemi | H04B 10/071 |
| 2022/0167276 | A1* | 5/2022 | Kumar | H04W 52/146 |
| 2022/0232367 | A1* | 7/2022 | Gopal | H04W 52/52 |
| 2022/0408286 | A1* | 12/2022 | Kumar | H04W 52/10 |
| 2023/0076874 | A1* | 3/2023 | Jeon | G01S 7/021 |
| 2023/0239802 | A1* | 7/2023 | Kumar | H04W 52/367 |
| | | | | 370/318 |
| 2023/0247511 | A1* | 8/2023 | Kumar | H04W 52/241 |
| | | | | 455/436 |
| 2023/0280395 | A1* | 9/2023 | Munzer | H01Q 3/267 |
| | | | | 324/750.3 |
| 2023/0283314 | A1* | 9/2023 | Cho | H04B 1/3827 |
| | | | | 455/522 |
| 2023/0324533 | A1* | 10/2023 | Jeon | G01S 13/003 |
| 2023/0362898 | A1* | 11/2023 | Jeon | G01S 7/0235 |
| 2024/0073904 | A1* | 2/2024 | Kumar | H04L 1/0057 |
| 2024/0214950 | A1* | 6/2024 | Bahadursha | H04W 52/367 |
| 2025/0039807 | A1* | 1/2025 | Kumar | H04W 52/367 |

* cited by examiner

COHERENT UPLINK MIMO

FIELD OF TECHNOLOGY

The following relates to wireless communications, including improving the performance of coherent uplink multiple-input multiple-output (MIMO) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). A UE may perform communications using MIMO procedures, which may allow the UE to transmit or receive multiple signals via different spatial layers using a plurality of antennas at the UE.

SUMMARY

The described techniques relate to improved methods, systems, devices, and apparatuses that support improving the performance of coherent uplink MIMO communications. In some cases, a UE may experience an amplitude mismatch (e.g., imbalance) between two or more antennas used for a transmission (e.g., a coherent MIMO transmission), which may result in decreased transmission performance and throughput. As such, the UE may be configured to estimate an output power for a plurality of antennas of the UE to determine an amplitude mismatch (e.g., an amplitude imbalance) between two or more antennas used for a transmission. For example, the UE may be subject to a limit on the amount of amplitude mismatch between the two or more antennas, and as such, the UE may adjust an input power associated with at least one of the two or more antennas to reduce the amplitude mismatch. In some cases, however, the amount of amplitude mismatch of a radiated signal from the two or more antennas may be greater than an amount predicted by the UE (e.g., a conducted amplitude mismatch, in a conducted mode) due to, for example, different amounts of output (e.g., external) impedance at each of the two or more antennas, and the adjusted input power may not mitigate the amplitude mismatch. Therefore, techniques for further reducing amplitude mismatch of radiated signals (e.g., in a radiated mode) may be desired for improving transmission performance, such as in coherent MIMO scenarios.

In accordance with examples as described herein, a UE may measure reflected power values at one or more antennas of the UE to estimate a radiated power loss at the one or more antennas. The UE may then adjust an input power associated with at least one antenna of the UE based on the reflected power at the one or more antennas, which may reduce amplitude mismatch caused by radiated power loss. For example, the UE may increase an input power for a first antenna based on a reflected power associated with the first antenna or based on a difference between the reflected power value associated with the first antenna and a reflected power value associated with a second antenna. Additionally, or alternatively, the UE may decrease an input power for an antenna based on the measured reflected power values (e.g., in cases where the UE is operating near a power limit associated with the UE). Accordingly, by estimating a radiated power loss based on measuring a reflected power at one or more antennas, the UE may reduce amplitude mismatch associated with radiated signals, thereby improving transmission performance.

A method for wireless communication by a UE is described. The method may include measuring a first amount of reflected power associated with a first antenna of the UE, measuring a second amount of reflected power associated with a second antenna of the UE, adjusting an input power for the first antenna based on the first amount of reflected power or the second amount of reflected power, and performing a transmission via the first antenna using the adjusted input power for the first antenna.

A UE for wireless communication is described. The UE may include one or more memories storing processor executable code, and one or more processors coupled with the one or more memories. The one or more processors may individually or collectively operable to execute the code to cause the UE to measure a first amount of reflected power associated with a first antenna of the UE, measure a second amount of reflected power associated with a second antenna of the UE, adjust an input power for the first antenna based on the first amount of reflected power or the second amount of reflected power, and perform a transmission via the first antenna using the adjusted input power for the first antenna.

Another UE for wireless communication is described. The UE may include means for measuring a first amount of reflected power associated with a first antenna of the UE, means for measuring a second amount of reflected power associated with a second antenna of the UE, means for adjusting an input power for the first antenna based on the first amount of reflected power or the second amount of reflected power, and means for performing a transmission via the first antenna using the adjusted input power for the first antenna.

A non-transitory computer-readable medium storing code for wireless communication is described. The code may include instructions executable by a processor to measure a first amount of reflected power associated with a first antenna of the UE, measure a second amount of reflected power associated with a second antenna of the UE, adjust an input power for the first antenna based on the first amount of reflected power or the second amount of reflected power, and perform a transmission via the first antenna using the adjusted input power for the first antenna.

In some examples of the method, UEs, and non-transitory computer-readable medium described herein, adjusting the input power for the first antenna may include operations, features, means, or instructions for increasing the input power for the first antenna by an amount that may be based on the first amount of reflected power.

Some examples of the method, UEs, and non-transitory computer-readable medium described herein may further include operations, features, means, or instructions for increasing the input power for the second antenna by an amount that may be based on the second amount of reflected power.

In some examples of the method, UEs, and non-transitory computer-readable medium described herein, performing the transmission may include operations, features, means, or instructions for performing the transmission concurrently via the first antenna and the second antenna based on the increased input power for the first antenna and the increased input power for the second antenna.

In some examples of the method, UEs, and non-transitory computer-readable medium described herein, adjusting the input power for the first antenna may include operations, features, means, or instructions for decreasing the input power for the first antenna by an amount that may be based on the second amount of reflected power.

Some examples of the method, UEs, and non-transitory computer-readable medium described herein may further include operations, features, means, or instructions for decreasing the input power for the first antenna includes disabling transmit circuitry coupled with the first antenna.

Some examples of the method, UEs, and non-transitory computer-readable medium described herein may further include operations, features, means, or instructions for decreasing the input power for the first antenna may be based on a difference between the first amount of reflected power and the second amount of reflected power satisfying a threshold.

Some examples of the method, UEs, and non-transitory computer-readable medium described herein may further include operations, features, means, or instructions for decreasing the input power for the first antenna may be based on a transmission power limit associated with the second antenna.

Some examples of the method, UEs, and non-transitory computer-readable medium described herein may further include operations, features, means, or instructions for decreasing the input power for the first antenna by at least a first portion of a difference between the first amount of reflected power and the second amount of reflected power and increasing the input power for the second antenna by at least a second portion of the difference between the first amount of reflected power and the second amount of reflected power.

In some examples of the method, UEs, and non-transitory computer-readable medium described herein, performing the transmission may include operations, features, means, or instructions for performing the transmission concurrently via the first antenna and the second antenna based on the decreased input power for the first antenna and the increased input power for the second antenna.

Some examples of the method, UEs, and non-transitory computer-readable medium described herein may further include operations, features, means, or instructions for adjusting the input power for the first antenna may be based on a difference between the first amount of reflected power and the second amount of reflected power.

In some examples of the method, UEs, and non-transitory computer-readable medium described herein, periodically measuring an amount of reflected power associated with the first antenna, where measuring the second amount of reflected power may be based on periodically measuring the amount of reflective power.

Some examples of the method, UEs, and non-transitory computer-readable medium described herein may further include operations, features, means, or instructions for detect that a difference between a first periodic measurement of the amount of reflected power associated with the first antenna and a second periodic measurement of the amount of reflected power associated with the first antenna exceeds a threshold, where measuring the second amount of reflected power associated with the second antenna may be based on the detecting.

Some examples of the method, UEs, and non-transitory computer-readable medium described herein may further include operations, features, means, or instructions for detecting a change in a position of the UE, a change in a grip type associated with the UE, a change in blockage surrounding the UE, or any combination thereof, based on the periodic measurements of the amount of reflected power associated with the first antenna, where measuring the second amount of reflected power associated with the second antenna may be based on detecting the change.

In some examples of the method, UEs, and non-transitory computer-readable medium described herein, measuring the first amount of reflected power may include operations, features, means, or instructions for measuring a first power downstream of a power amplifier of the UE based on a coupler component of the UE operating in a forward position and measuring a second power associated with reflection of a radiated signal based on the coupler component operating in a reverse position.

In some examples of the method, UEs, and non-transitory computer-readable medium described herein, the first amount of reflected power may be based on a difference between the first power and the second power.

In some examples of the method, UEs, and non-transitory computer-readable medium described herein, performing the transmission may include operations, features, means, or instructions for transmitting concurrently via the first antenna and the second antenna based on the adjusted input power for the first antenna.

DETAILED DESCRIPTION

In some systems, a UE may use coherent MIMO techniques to increase transmission data rates. In some examples, the UE may experience an amplitude mismatch (e.g., imbalance) between two or more antennas used for a transmission (e.g., a coherent MIMO transmission), which may result in decreased transmission performance and throughput. As such, the UE may be configured to estimate an output power for a plurality of antennas of the UE to determine an amplitude mismatch (e.g., an amplitude imbalance) between two or more antennas used for a transmission. For example, the UE may be subject to a limit on the amount of amplitude mismatch between the two or more antennas, and as such, the UE may adjust an input power associated with at least one of the two or more antennas to reduce the amplitude mismatch. In some cases, however, the amount of amplitude mismatch of a radiated signal from the two or more antennas may be greater than an amount predicted by the UE (e.g., a conducted amplitude mismatch, in a conducted mode) due to, for example, different amounts of output (e.g., external) impedance at each of the two or more antennas, and the adjusted input power may not mitigate the amplitude mismatch. Therefore, techniques for further reducing amplitude mismatch of radiated signals (e.g., in a radiated mode) may be desired for improving transmission performance, such as in coherent MIMO scenarios.

In accordance with examples as described herein, a UE may measure reflected power values at one or more antennas of the UE to estimate a radiated power loss at the one or more antennas. The UE may then adjust an input power associated with at least one antenna of the UE based on the reflected power at the one or more antennas, which may reduce amplitude mismatch caused by radiated power loss. For example, the UE may increase an input power for a first antenna based on a reflected power associated with the first antenna or based on a difference between the reflected power value associated with the first antenna and a reflected power value associated with a second antenna. Additionally, or alternatively, the UE may decrease an input power for an antenna based on the measured reflected power values (e.g., in cases where the UE is operating near a power limit associated with the UE). Accordingly, by estimating a radiated power loss based on measuring a reflected power at one or more antennas, the UE may reduce amplitude mismatch associated with radiated signals, thereby improving transmission performance.

Aspects of the disclosure are initially described in the context of wireless communications systems. Aspects of the disclosure are additionally illustrated in the context of functional blocks and process flows. Aspects of the disclosure are further illustrated by and described with reference to apparatus diagrams, system diagrams, and flowcharts that relate to improving the performance of coherent uplink MIMO communications.

Figure 1:
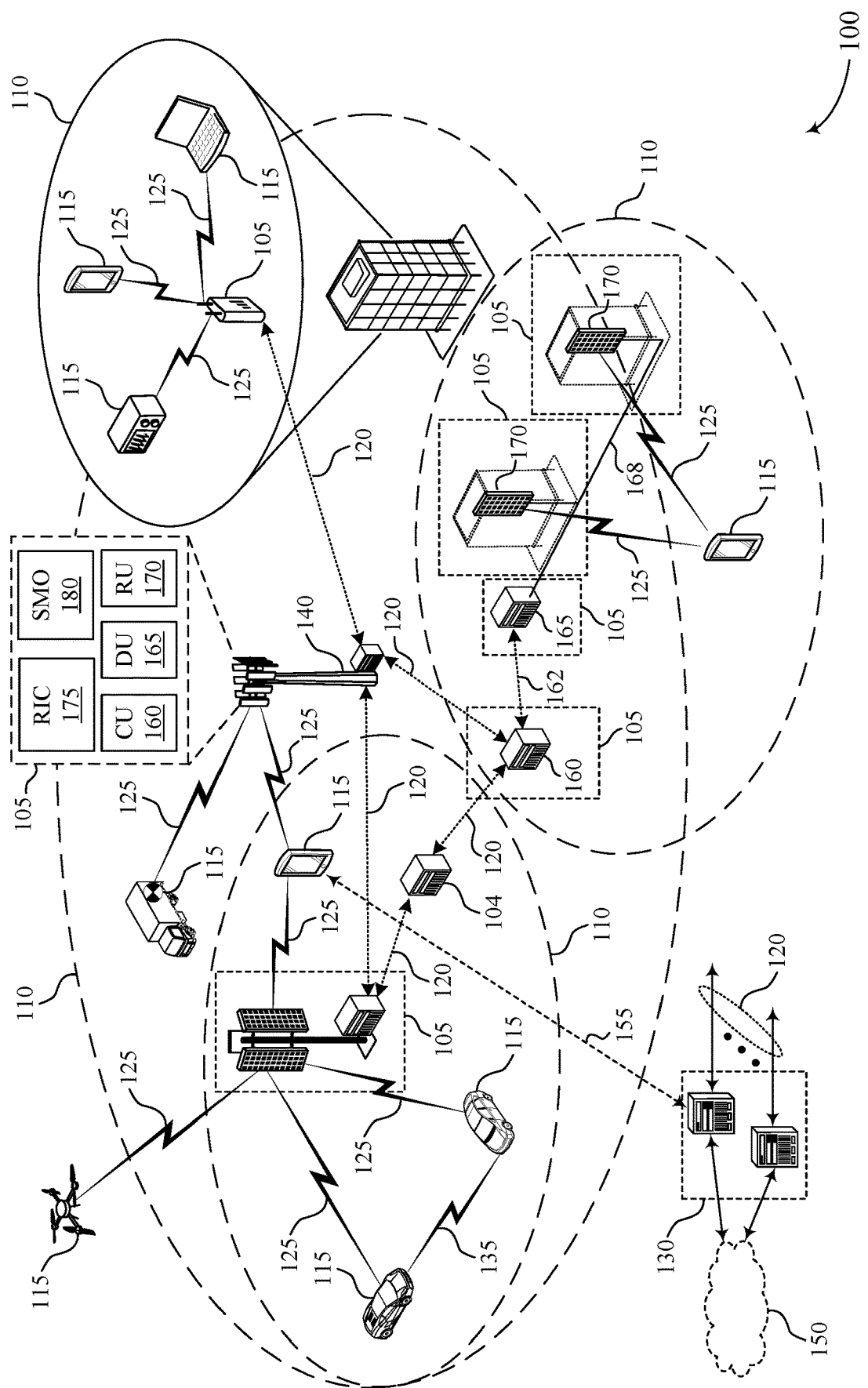
FIG. 1 shows an example of a wireless communications system that supports improving the performance of coherent uplink MIMO communications in accordance with one or more aspects of the present disclosure.

FIG. 1 shows an example of a wireless communications system 100 that supports improving the performance of coherent uplink MIMO communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support improving the performance of coherent uplink MIMO communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may use coherent MIMO techniques to increase transmission data rates, in which the UE 115 may perform transmissions using at least two antennas, and the UE 115 may be configured to maintain coherence between the at least two antennas. For example, the UE 115 may maintain a phase and an amplitude of a first antenna relatively balanced with a phase and an amplitude of a second antenna. Similarly, to maintain coherence, the UE 115 may attempt to minimize an error in phase and in amplitude with respect to a previous (e.g., last) symbol (e.g., a sounding reference signal (SRS) symbol). Further, in some examples, the UE 115 may be subject to (e.g., configured with) a limit on the amount of amplitude mismatch between two or more antennas for a transmission to a network entity 105. As such, the UE 115 may be configured to estimate an output power for a plurality of antennas of the UE 115 to determine an amplitude mismatch (e.g., imbalance) or a phase mismatch between two or more antennas used for the transmission, and the UE 115 may adjust input powers for the plurality of antennas to decrease the amplitude and phase mismatch.

The UE 115 may be configured to estimate an amplitude mismatch between the two or more antennas in a conducted mode. For example, the UE 115 may measure a power value at an output of a power amplifier to determine estimated output power values associated with an antenna. In some examples, the UE 115 may measure and adjust the output power values using an inner loop power control (ILPC), which include one or more components (e.g., a feedback receive (FBRx) component, a feedback low noise amplifier (LNA), a low pass filter (LPF)) configured to measure power values outputted by a power amplifier, and modify an input power (e.g., at a component prior to the power amplifier) based on the measured power values. Components used by the UE 115 to measure and adjust power values associated with a transmission are described in further detail herein, with reference to FIG. 3. As such, the UE 115 may compensate for amplitude mismatch to improve coherence between the two or more antennas.

In some cases, however, the amount of amplitude mismatch measured by the UE 115 in the conducted mode (e.g., internally, at the output of the power amplifier) may not account for amplitude mismatch in a radiated mode, and the amplitude mismatch between radiated signals of two or more antennas may be greater than an amount predicted by the UE 115 in the conducted mode. For instance, if the UE 115 measures power values (e.g., a conducted power values) at an output of a power amplifier, the UE 115 may be unaware of amplitude mismatch caused by external impedance, usage of different antennas (e.g., between primary and secondary antennas), or different antenna tuner configurations or usage. In some cases, for example, antennas of the UE 115 may be located in different locations around the UE 115, which may cause external impedance to vary for each of the antennas. Similarly, the positioning of the UE 115 (e.g., within a pocket, in relation to other objects or obstructions) or a grip position (e.g., hand positioning) of a user holding the UE 115 may cause different amounts of interference (e.g., external impedance) at each of the antennas, leading to amplitude mismatch of the radiated signals that may differ from a predicted amplitude mismatch by the UE. As such, techniques for estimating power loss of radiated signals and mitigating amplitude mismatch at two or more antennas of the UE 115 due to the power loss in the radiated mode may be desired.

In accordance with examples as described herein, the UE 115 may determine a reflected power at one or more antennas of the UE 115 to estimate a radiated power loss of a transmission at the one or more antennas. The UE 115 may then adjust an input power associated with at least one antenna of the UE 115 to compensate for amplitude mismatch caused by the radiated power loss. For example, the UE 115 may increase an input power for a first antenna based on a reflected power value associated with the first antenna, or based on a difference between the reflected power value associated with the first antenna and a reflected power value associated with a second antenna. Additionally, or alternatively, the UE 115 may decrease an input power for an antenna based on the measured reflected power values (e.g., in cases where the UE 115 is operating near a power limit associated with the UE 115). Accordingly, by estimating a radiated power loss based on measuring reflected power values at two or more antennas, the UE 115 may reduce amplitude mismatch associated with radiated signals, thereby improving transmission performance.

Figure 2:
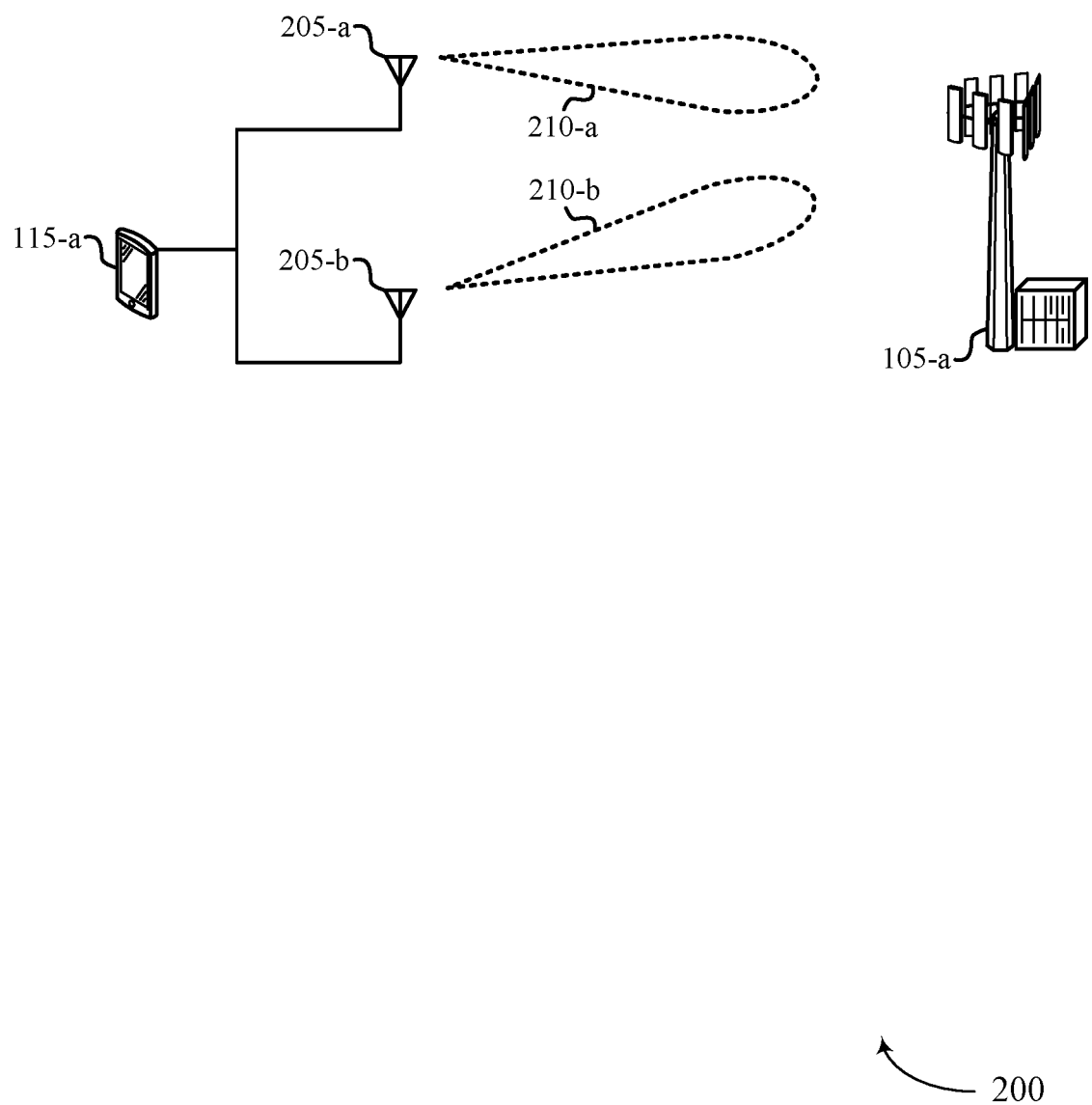
FIG. 2 shows an example of a wireless communications system that supports improving the performance of coherent uplink MIMO communications in accordance with one or more aspects of the present disclosure.

FIG. 2 shows an example of a wireless communications system 200 that supports improving the performance of coherent uplink MIMO communications in accordance with one or more aspects of the present disclosure. The wireless communications system 200 may include a UE 115-a and a network entity 105-a, which may be examples of corresponding devices as described herein, with reference to FIG. 1. The UE 115-a may perform communications (e.g., MIMO transmissions, coherent MIMO transmissions) with the network entity 105-a via a plurality of antennas. For example, the UE 115-a may utilize an antenna 205-a and an antenna 205-*b* for a transmission by emitting a signal 210-*a* and a signal 210-*b* from each of the antenna 205-*a* and the antenna 205-*b*, respectively. While FIG. 2 illustrates an example with respect to two antennas 205, techniques described herein may be implemented with respect to a larger quantity of antennas 205 of a UE 115.

In some cases, the UE 115-*a* may estimate an amplitude mismatch between the antenna 205-*a* and the antenna 205-*b* (e.g., or the signal 210-*a* and the signal 210-*b*) in a conducted mode. For example, the UE 115-*a* may measure power values at an output of one or more power amplifiers of the UE 115-*a* to determine estimated output power values associated with the antenna 205-*a* and the antenna 205-*b*, and the UE 115-*a* may compensate for estimated amplitude mismatch to improve coherence between the antenna 205-*a* and the antenna 205-*b*. In some cases, however, the amount of amplitude mismatch estimated by the UE 115 in the conducted mode (e.g., internally, at the output of a power amplifier) may not account for amplitude mismatch in a radiated mode (e.g., as radiated over the air by the antennas 205). That is, the amplitude mismatch between radiated signals, such as the signal 210-*a* and the signal 210-*b*, may be greater than an amount predicted by the UE 115-*a* in the conducted mode. In some examples, the antenna 205-*a* and the antenna 205-*b* may be located in different locations around the UE 115-*a*, which may cause external impedance to vary for each of the antennas. Similarly, the positioning of the UE 115-*a* (e.g., in relation to other objects or obstructions), a grip position (e.g., hand positioning) of a user holding the UE 115-*a*, or asymmetric antenna tuner configurations may cause different amounts of interference (e.g., external impedance) at each of the antenna 205-*a* and the antenna 205-*b*, leading to amplitude mismatch between the signal 210-*a* and the signal 210-*b*.

In accordance with examples as described herein, the UE 115-*a* may determine reflected power values (e.g., an amount of radiated power that is reflected back to components of the UE 115-*a*) associated with a radiated power loss by transmissions at each of the antenna 205-*a* and the antenna 205-*b*. For example, the UE 115-*a* may measure a first reflected power associated with the antenna 205-*a* while performing a transmission via the antenna 205-*a*. Similarly, the UE 115-*b* may measure a second reflected power associated with the antenna 205-*b* while performing a transmission via the antenna 205-*b*. The UE 115-*a* may determine reflected power values based on a voltage standing wave ratio (VSWR) calculation using one or more components, such as a coupler, as described in more detail herein with reference to FIG. 3.

In some cases (e.g., if the UE 115-*a* includes multiple ILPC components, such as an ILPC component associated to each antenna 205), the UE 115-*a* may measure reflected power values concurrently for two or more antennas 205, such as the antenna 205-*a* and the antenna 205-*b*. Alternatively (e.g., if an ILPC component is shared between antennas 205), the UE 115-*a* may measure reflected power values for each antenna separately, such as by performing measurements in a round robin fashion for each antenna 205. In some cases, the UE 115-*a* may perform reflected power measurements based on a timer (e.g., at the expiration of the timer), and the UE 115-*a* may perform VSWR calculating at each component chain associated with each antenna 205 (e.g., staggered such as to provide the round robin fashion). Additionally, or alternatively, the UE 115-*a* may perform reflected power measurements prior to an occasion for an upcoming transmission (e.g., in preparation for the upcoming transmission).

In some examples, the UE 115-*a* may perform periodic reflected power measurements of at least one antenna 205, and the UE 115-*a* may determine whether to perform reflected power measurement for other antennas 205 based on the reflected power measurements of the at least one antenna 205. For example, the UE 115-*a* may perform periodic reflected power measurements for the antenna 205-*a* based on a timer, which may result in performing the periodic measurements every T milliseconds. The UE 115-*a* may then perform a power measurement value for the antenna 205-*b* based on the periodic measurements for the antenna 205-*a*. For example, the UE 115-*a* may detect a change between periodic reflected power measurement values for the antenna 205-*a* (e.g., a difference between a first measurement and a second measurement), and the UE 115-*a* may perform reflected power measurements at other antennas 205 based on the change.

In some examples, the UE 115-*a* may determine a change in a scenario associated with a change in amplitude mismatch of radiated signals 210, and the UE 115-*a* may perform reflected power measurements based on the change in the scenario. For example, the UE 115-*a* may detect a change in a scenario based on the measurements of the antenna 205-*a* or based on other factors (e.g., based on sensors equipped to the UE 115-*a*), and the scenario detection may be periodic and occur at the expiration of the timer (e.g., every T milliseconds). The change in the scenario may include, for example, a change in free space around the UE 115-*a*, a change in a hand grip or position of a user holding the UE 115-*a*, a change in a blockage (e.g., surface blockage, blockage positioning) relative to (e.g., surrounding) the UE 115-*a*, or any combination thereof.

In some examples, the UE 115-*a* may determine the change in a scenario based on determining a change between a first periodic reflected power measurement and a second periodic reflected power measurement associated with the antenna 205-*a*. For example, the UE 115-*a* may determine that the change between the first periodic reflected power measurement and the second periodic reflected power measurement exceeds a threshold value, and the UE 115-*a* may determine that the scenario has changed. Additionally, or alternatively, the UE 115-*a* may determine the change in the scenario, such as a change in a hand grip position, free space surrounding the UE 115-*a*, or blockage around the UE 115-*a*, based on one or more antenna tuners (e.g., a current tune code of an antenna tuner) of the UE 115-*a*. As such, the UE 115-*a* may perform reflected power measurements on the antenna 205-*b* (e.g., and other antennas 205) based on the change in scenario. By performing measurements of other antennas 205, such as the antenna 205-*b*, based on the change in the scenario that may be associated with a change in amplitude mismatch, the UE 115-*a* may reduce power consumption associated with performing reflected power measurements. For example, in cases where the scenario does not change (e.g., or changes with low frequency), the UE 115-*a* may greatly reduce the quantity of reflected power measurements (e.g., VSWR calculations) performed.

The UE 115-*a* may adjust an input power associated with at least one antenna 205 based on reflected power measurements to reduce for amplitude mismatch caused by radiated power loss. For example, the UE 115-*a* may increase an input power for the antenna 205-*a* by an amount of reflected power measured for the antenna 205-*a*, and the UE 115-*a* may similarly increase an input power for the antenna 205-*b* by an amount of reflected power measured for the antenna 205-*b* (e.g., and similarly for other antennas 205). As such, the radiated power of the signal 210-*a* and the signal 210-*b* may account for reflected power loss, which may reduce amplitude mismatch between the signal 210-*a* and the signal 210-*b* when detected by the network entity 105-*a*.

The UE 115-*a* may compensate for the measured amount of reflected power loss. In some examples, the UE 115-*a* may increase an input power for the antenna 205-*a* based on a difference between a reflected power value associated with the antenna 205-*a* and a reflected power value associated with the antenna 205-*b*. For instance, the UE 115-*a* may measure a reflected power value of 4 decibels (dB) associated with the signal 210-*a* transmitted by the antenna 205-*a*, and a reflected power value of 2 dB associated with the signal 210-*b* transmitted by the antenna 205-*b*. As such, the UE 115-*a* may determine to increase the input power associated with the antenna 205-*a* by a value of 2 dB. Thus, the UE 115-*a* may reduce the amplitude mismatch between the signal 210-*a* and the signal 210-*b* by adjusting the input power of one antenna 205 (e.g., the antenna 205-*a* in this example). This may reduce an overall power consumption of the UE 115-*a* relative to increasing the power of each antenna 205, such as increasing the input power for the antenna 205-*a* by 4 dB and the input power for the antenna 205-*b* by 2 dB, while still maintaining coherence between the antenna 205-*a* and the antenna 205-*b*.

In some cases, the UE 115-*a* may instead decrease an input power for an antenna 205 based on the measured reflected power values. In the example above, for instance, the UE 115-*a* may instead decrease the input power associated with the antenna 205-*b* by a value of 2 dB. This may further reduce power consumption at the UE 115-*a*, but may also decrease a signal strength at the network entity 105-*a*. As such, the UE 115-*a* may default to increasing input power values unless, for example, a power limit (e.g., maximum power limit) prevents the UE 115-*a* from further increasing an input power to an antenna 205. Still, the UE 115-*a* may account for radiated power loss based on measured reflected power values by decreasing an input power of at least one of the antenna 205-*a* and the antenna 205-*b*, which may decrease or mitigate amplitude mismatch associated with the signal 210-*a* and the signal 210-*b*. In some examples, decreasing the input power for an antenna 205 may be based on the difference in measured reflected power values exceeding a threshold value, which may ensure the UE 115-*a* does not increase an input power by over some threshold amount.

In some examples, the UE 115-*a* may be subject to a power limit (e.g., for one or more antennas 205, or an overall power limit for the UE 115-*a* and all antennas 205). In some cases, the power limit (e.g., maximum power limit) may be associated with limiting interference caused by the UE 115-*a* (e.g., to adjacent devices) or limiting non-linear distortion at a power amplifier of the UE 115-*a*. Additionally, or alternatively, the power limit may be due to a limit in the power available to the UE 115-*a*, a limit to the power able to be provided to an antenna 205 by the UE 115-*a* (e.g., due to limits on a component of the UE 115-*a*), or a limit to the amount of power that an antenna 205 may emit. As such, the UE 115-*a* may determine whether to increase an input power for an antenna 205 or decrease an input power for another antenna 205, or both, based on a power limit that the UE 115-*a* is subject to.

For example, the UE 115-*a* may determine that the UE 115-*a* is operating at or near (e.g., within a threshold range of) a power limit associated with the UE 115-*a*. The UE 115-*a* may therefore determine to decrease an input power of an antenna 205 associated with the lowest amount of reflected power. Referring to the earlier example, the UE 115-*a* may determine to decrease an input power associated with the antenna 205-*b* by a value of 2 dB (e.g., instead of increasing an input power associated with the antenna 205-*a* by a value of 2 dB). Meanwhile, if the UE 115-*a* is not operating at or near a power limit, the UE 115-*a* may determine to (e.g., or default to) increasing an input power of an antenna 205 associated with the highest amount of reflected power (e.g., the antenna 205-*a* in the above example). By defaulting to increasing the input power of an antenna 205 associated with the highest amount of reflected power, the UE 115-*a* may improve performance as a transmission received by the network entity 105-*a* may be stronger (e.g., have a higher received power value). Further, by reducing the input power of an antenna 205 associated with a lowest amount of reflected power, the UE 115-*a* may still reduce amplitude mismatch while complying with a power limit associated with the UE 115-*a*.

In some cases, the UE 115-*a* may determine to use a hybrid approach involving decreasing an input power for an antenna 205 by a portion of the difference in reflected power values and increasing an input power for another antenna 205 by another portion of the difference in reflected power values, and the portions may be or may not be the same amount. For example, if a reflected power value associated with the antenna 205-*a* is 2 dB and a reflected power value associated with the antenna 205-*b* is 5 dB, the difference between the reflected power values associated with the antenna 205-*a* and the antenna 205-*b* is 3 dB. As such, the UE 115-*a* may decrease the input power for the antenna 205-*a* by 1 dB and increase the input power for the antenna 205-*b* by 2 dB, or the UE 115-*a* may adjust the input power for both antennas may by the same amount (e.g., 1.5 dB).

In some cases, the UE 115-*a* may determine to use the hybrid approach and may determine the amounts by which to adjust each input power based on a power limit associated with the UE 115-*a*. For example, to comply with a power limit, the UE 115-*a* may increase the input power associated with the antenna 205-*b* by the largest amount that would not violate the power limit. If this amount is lower than the difference between reflected power values of the antenna 205-*a* and the antenna 205-*b*, the UE 115-*a* may determine to perform the hybrid approach and decrease the input power of the antenna 205-*a* by the rest of the difference between reflected power values. For instance, in the previous example with a difference of 3 dB between reflected power values, the UE 115-*a* may be operating 1 dB from an overall power limit associated with the UE 115-*b*. As such, the UE 115-*a* may able to increase the input power for the antenna 205-*b* by only 2 dB, and the UE 115-*a* may also decrease the input power for the antenna 205-*a* by 1 dB, which may maintain coherence between the antenna 205-*a* and the antenna 205-*b* while not violating the power limit. A similar situation may arise if the UE 115-*a* was operating 2 dB from a power limit for the antenna 205-*b*.

In cases where the UE 115-*a* is operating with an overall power that is at a power limit, and the power limit refers to an overall power limit for the UE 115-*a*, the UE 115-*a* may determine to increase the input power associated with the antenna 205-*b* and decrease the input power associated with the antenna 205-*a* by a same amount (e.g., 1.5 dB in the previous example). This may maintain coherence between the antenna 205-*a* and the antenna 205-*b* while the overall power of the UE 115-*a* stays at the power limit.

In some cases, a power limit may refer to a limit on a power that is actually radiated by the UE 115-*a*. Due to the reflected power loss, the actual radiated power by the UE 115-*a* may not increase even as the UE 115-*a* increases an input power to an antenna 205. As such, the UE 115-a may simply default to increasing input power to an antenna 205 in most (e.g., or all) cases, without consideration of the power limit, as the power actually radiated by the UE 115-a (e.g., as determined by a receiving device, such as the network entity 105-a) may not be changing.

Accordingly, by estimating a radiated power loss based on measuring reflected power values at the antenna 205-a and the antenna 205-b, the UE 115-a may reduce amplitude mismatch associated with the radiated signals 210-a and the signal 210-b, thereby improving transmission performance.

Figure 3:
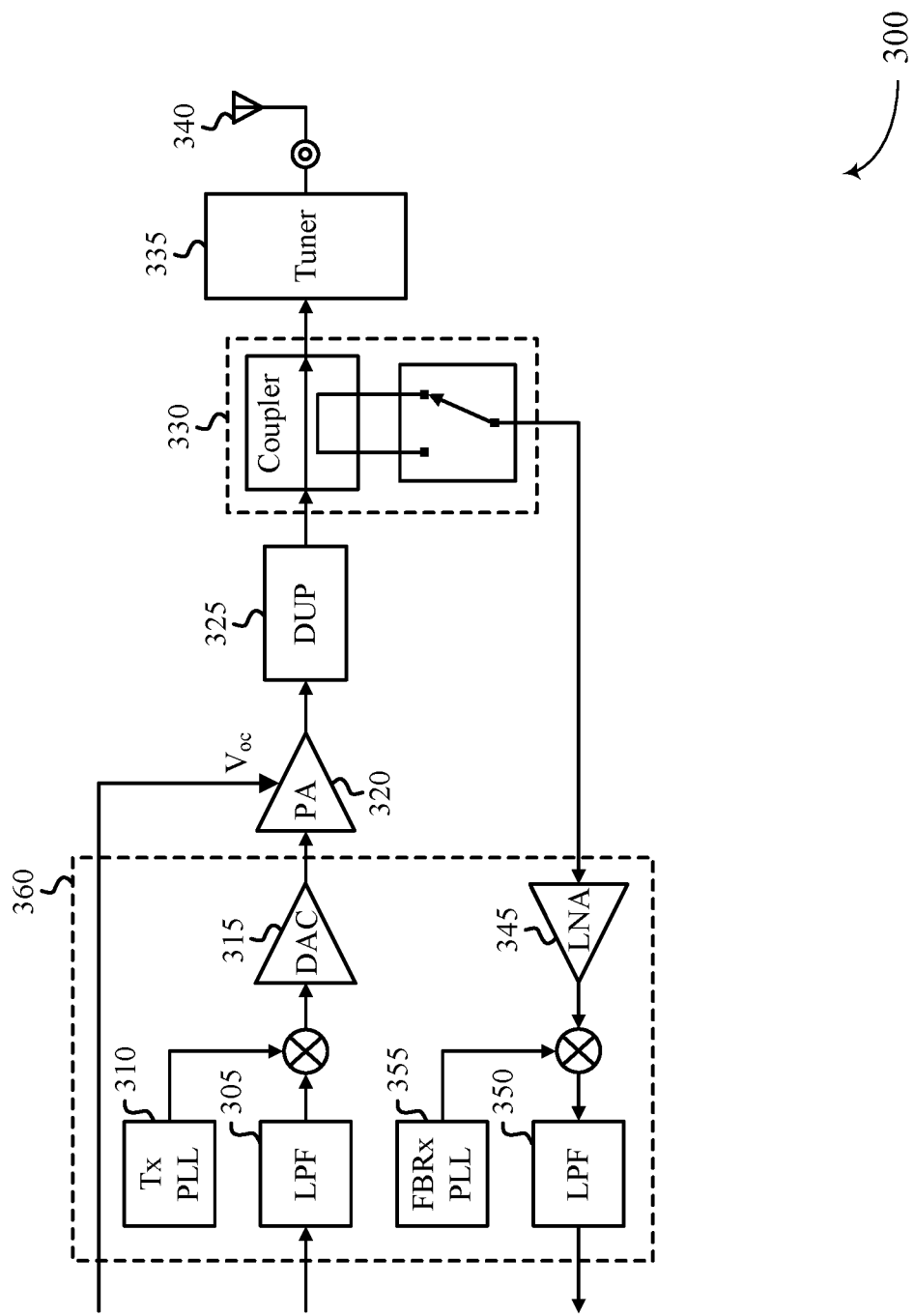
FIG. 3 shows an example of functional blocks for an antenna circuit that supports improving the performance of coherent uplink MIMO communications in accordance with one or more aspects of the present disclosure.

FIG. 3 shows an example of functional blocks for an antenna circuit 300 that supports improving the performance of coherent uplink MIMO communications in accordance with one or more aspects of the present disclosure. While a single antenna 340 is depicted to be included in the antenna circuit 300, the antenna circuit 300 may, in some examples, include multiple antennas 340 that share components of the antenna circuit 300. Additionally, or alternatively, a UE 115 may include multiple antenna circuits 300, and, in some cases, each antenna 340 of the UE 115 may be associated with a different antenna circuit 300. In some examples, some components shown in FIG. 3 may be omitted from the antenna circuit 300, and some components may be added to the antenna circuit 300.

The antenna circuit 300, which may correspond to a transmit chain of components, may include an analog circuit 360. The analog circuit 360 may include a plurality of components associated with processing an analog signal. For example, the analog circuit 360 may include an LPF 305 which may filter a signal outputted by other components at a UE 115. The analog circuit 360 may also include a transmit (Tx) PLL 310, which may adjust (e.g., modulate, demodulate, stabilize, filter) the analog signal, and the Tx PLL 310 may serve to adjust the phase of the analog signal. The analog circuit 360 may include a digital-to-analog converter (DAC) 315, which may convert the analog signal into a digital signal.

The DAC 315 may output the digital signal to a power amplifier (PA) 320. The PA 320 may amplify (e.g., boost) the digital signal prior to transmission by an antenna 340, and, in some cases, the PA 320 may amplify the digital signal to meet a power limit associated with the UE 115. In some examples, the PA 320 may receive power from the UE 115 via a voltage source (e.g., $V_{oc}$). The PA 320 may output the digital signal to a duplexer (DUP) 325, which may be configured to isolate a receiving circuit and a transmitting circuit (e.g., the antenna circuit 300) from the antenna 340 such that the UE 115 may utilize the antenna 340 for transmission or reception.

The DUP 325 may output the digital signal to a coupler 330 (e.g., a directional coupler). The coupler 330 may have a forward and a reverse position. To perform reflected power measurements, as described herein with reference to FIGS. 1 and 2, the UE 115 may perform measurements with the coupler 330 in the forward position and in the reverse position. For example, the UE 115 may perform VSWR calculations using Equation 1 below.

$$VSWR = \frac{1+|\Gamma|}{1-|\Gamma|} \quad (1)$$

where $\Gamma$ is a reflection coefficient that may correspond to a ratio between a complex amplitude of a reflected signal (e.g., reflected wave) to a complex amplitude of an incident signal (e.g., incident wave). In some examples, a smaller VSWR is associated with a better match (e.g., less power loss) between the antenna 340 and the transmission line (e.g., transmit chain components), and may indicate that a larger amount of power is being delivered to the antenna 340.

In some examples, to measure the reflected signal and the incident signal, the UE 115 may perform measurements based on a position of the coupler 330. For example, in a forward mode, the coupler 330 may allow estimation of a transmit power available at the coupler 330 as the digital signal is outputted to the antenna 340, which may allow the UE 115 to measure the incident signal (e.g., in a conducted mode). In some examples, the coupler 330 may allow estimation of the transmit power by creating a feedback loop, which may allow the UE to measure a signal (e.g., an analog signal) downstream of the PA 320 (e.g., and the DUP 325) to receiving components (e.g., feedback components) of the analog circuit 360, such as an LNA 345 (e.g., a feedback LNA).

Meanwhile, when the coupler 330 is in a reverse position, the coupler 330 may still allow the digital signal to reach the antenna 340, but a loss in power of the signal transmitted by the antenna 340 may be reflected into components of the antenna circuit 300. The coupler 330 may direct a signal (e.g., an analog signal) associated with the reflected portion of the transmitted signal to the receiving components of the analog circuit 360. As such, by operating the coupler 330 in the reverse mode, the UE 115 may measure a reflected signal. Accordingly, by performing measurements in the forward mode and the reverse mode of the coupler 330, the UE 115 may calculate a reflected power, and the UE 115 may adjust an input power associated with one or more antennas 340 as described herein (e.g., with reference to FIG. 2).

In some examples, the receiving components (e.g., ILPC components) of the analog circuit 360 may include the LNA 345, which may amplify an analog signal received by the LNA 345 by the coupler 330. The receiving components may also include an LPF 350 (e.g., a feedback or receive LPF) and a feedback receive (FBRx) PLL 355. When the coupler 330 is operating in the forward position, the FBRx PLL 355 may estimate a power at the output of the PA 320, which may ensure coherence between multiple antennas 340 of the UE 115 (e.g., without accounting for reflected power measurements).

In some examples, each antenna 340 of the UE 115, such as primary antennas and secondary antennas, may be associated with transmit circuitry such as a tuner 335 (e.g., an antenna tuner). Alternatively, the antenna 340, which may correspond to a primary antenna 340, may be associated with the use of the tuner 335, while other antennas 340 (e.g., secondary antennas), may not be associated with the use of a tuner 335. In some cases, due to asymmetry caused by only the antenna 340 being associated with the use of a tuner 335 during MIMO transmissions, the UE 115 may experience amplitude mismatch, even if external impedance is the same for each antenna 340. This asymmetry may not be accounted for by the feedback components (e.g., the FBRX PLL 355), which may obtain measurements prior to the tuner 335.

To reduce amplitude mismatch caused by the asymmetry from the tuners 335, the UE 115 may determine to (e.g., temporarily) disable the tuner 335 associated with the antenna 340. In some cases, even when multiple antennas 340 are associated with a tuner 335, there may be amplitude mismatch due to asymmetric tuner usage or tuner configurations. In these cases, the UE 115 may similarly determine to disable the tuners 335, or the UE 115 may reconfigure one or more of the tuners 335 to decrease the amplitude mismatch.

In some examples, such as if the UE 115 determined to decrease an input power associated with an antenna 340, as described herein with reference to FIG. 2, or if the UE 115 disabled one or more tuners 335 associated with an antenna 340, a transmit power associated with a transmitted signal may decrease. A receiving device, such as a network entity 105 may determine the decrease in transmit power and may determine that the transmit power associated with the UE 115 should be increased to improve reception of the transmitted signal. As such, the network entity 105 may transmit a transmit power control (TPC) command (e.g., via a downlink control information (DCI) message) to the UE 115. The TPC command may indicate or allow the UE 115 to increase a transmit power (e.g., by increasing a maximum power limit associated with the UE 115, for example). The UE 115 may distribute (e.g., equally split) the indicated increase in transmit power to each antenna 340 involved in a MIMO transmission. For instance, the UE 115 may increase an input power of two antennas 340 by a same amount, which may be half of the amount indicated in the TPC command (e.g., an amount by which a power limit was increased).

Accordingly, the UE 115 may reduce amplitude mismatch between signals transmitted by multiple antennas 340 in MIMO transmissions by ensuring coherence between antennas 340, while still increasing the transmit power to improve reception at the network entity 140.

Figure 4:
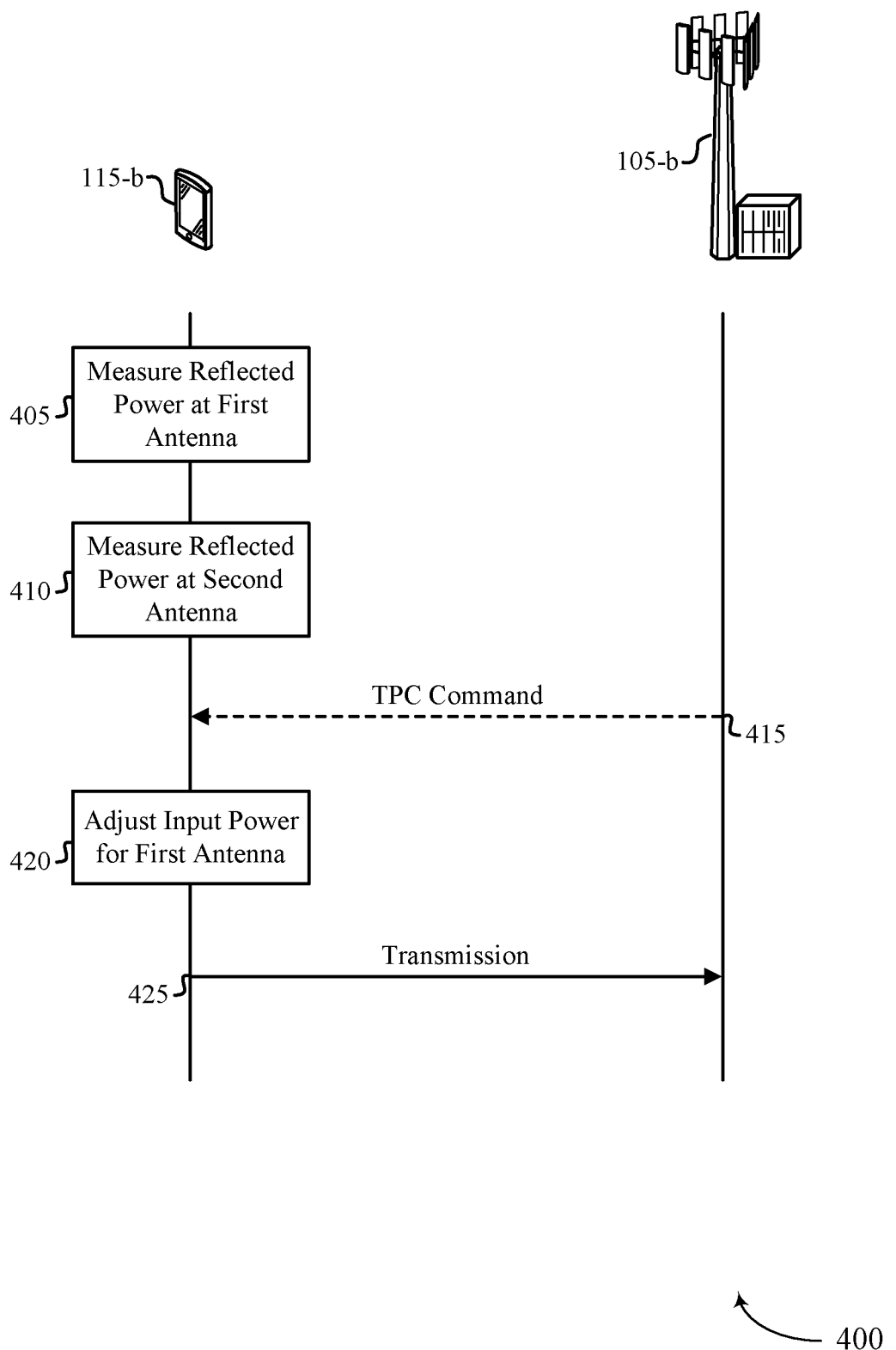
FIG. 4 shows an example of a process flow that supports improving the performance of coherent uplink MIMO communications in accordance with one or more aspects of the present disclosure.

FIG. 4 shows an example of a process flow 400 that supports improving the performance of coherent uplink MIMO communications in accordance with one or more aspects of the present disclosure. The process flow 400 may include a UE 115-*b* and a network entity 105-*b*, which may be examples of corresponding devices, as described herein with reference to FIGS. 1-3. In some examples, some steps may be removed from the process flow 400, while additional steps may be added to the process flow 400. Similarly, some steps shown may be performed in different orders than as shown.

At 405, the UE 115-*b* may measure a first reflected power at a first antenna of the UE 115-*b*. The first reflected power measurement may correspond to a reflected signal from a transmission of the UE 115-*b* via the first antenna. The UE 115-*b* may measure the first reflected power based on operating a coupler in a forward position and in a reverse position, as described herein with reference to FIG. 3. In some examples, the UE 115-*b* may perform reflected power measurements at the first antenna periodically based on an expiration of a timer.

At 410, the UE 115-*b* may measure a second reflected power at a second antenna of the UE 115-*b*. In some examples, the UE 115-*b* may measure the second reflected power based on measuring the first reflected power. For example, the UE 115-*b* may detect that a difference between a first periodic measurement at the first antenna and a second periodic measurement at the first antenna exceeds a threshold value. The UE 115-*b* may then perform a reflected power measurement at the second antenna based on the detecting that the difference exceeds the threshold value.

At 415, the UE 115-*b* may receive a TPC command from the network entity 105-*b*. For example, the TPC command may indicate that the UE 115-*b* is allowed to increase a transmit power associated with the first antenna and the second antenna (e.g., an overall transmit power). The TPC command may be transmitted by the network entity 105-*b* if the network entity 105-*b* determines that a received power associated with a transmission by the UE 115-*b* is below some threshold.

At 420, the UE 115-*b* may adjust an input power for the first antenna, as described herein with reference to FIG. 2. For example, the UE 115-*b* may increase the input power for the first antenna by a difference between the first reflected power measurement at the first antenna and the second reflected power measurement at the second antenna. This may increase coherence between the first antenna and the second antenna for coherent MIMO transmissions. Alternatively, the UE 115-*b* may decrease an input power for the second antenna by the difference between the first reflected power measurement at the first antenna and the second reflected power measurement at the second antenna. In some cases, the UE 115-*b* may perform a hybrid procedure instead, where the UE 115-*b* may increase the input power for the first antenna and decrease the input power for the second antenna.

In some examples, if the UE 115-*b* receives a TPC command from the network entity 105-*b*, the UE 115-*b* may increase the input power for both the first antenna and the second antenna (e.g., after adjusting the input power to increase coherence). For example, the UE 115-*b* may increase the input power for the first antenna and the second antenna by an amount that is half of an amount indicated in the TPC command.

At 425, the UE 115-*b* may perform a transmission (e.g., to the network entity 105-*b*) based on the adjusted input power for the first antenna. For example, the UE 115-*b* may perform a coherent MIMO transmission concurrently via the first antenna and the second antenna.

Figure 5:
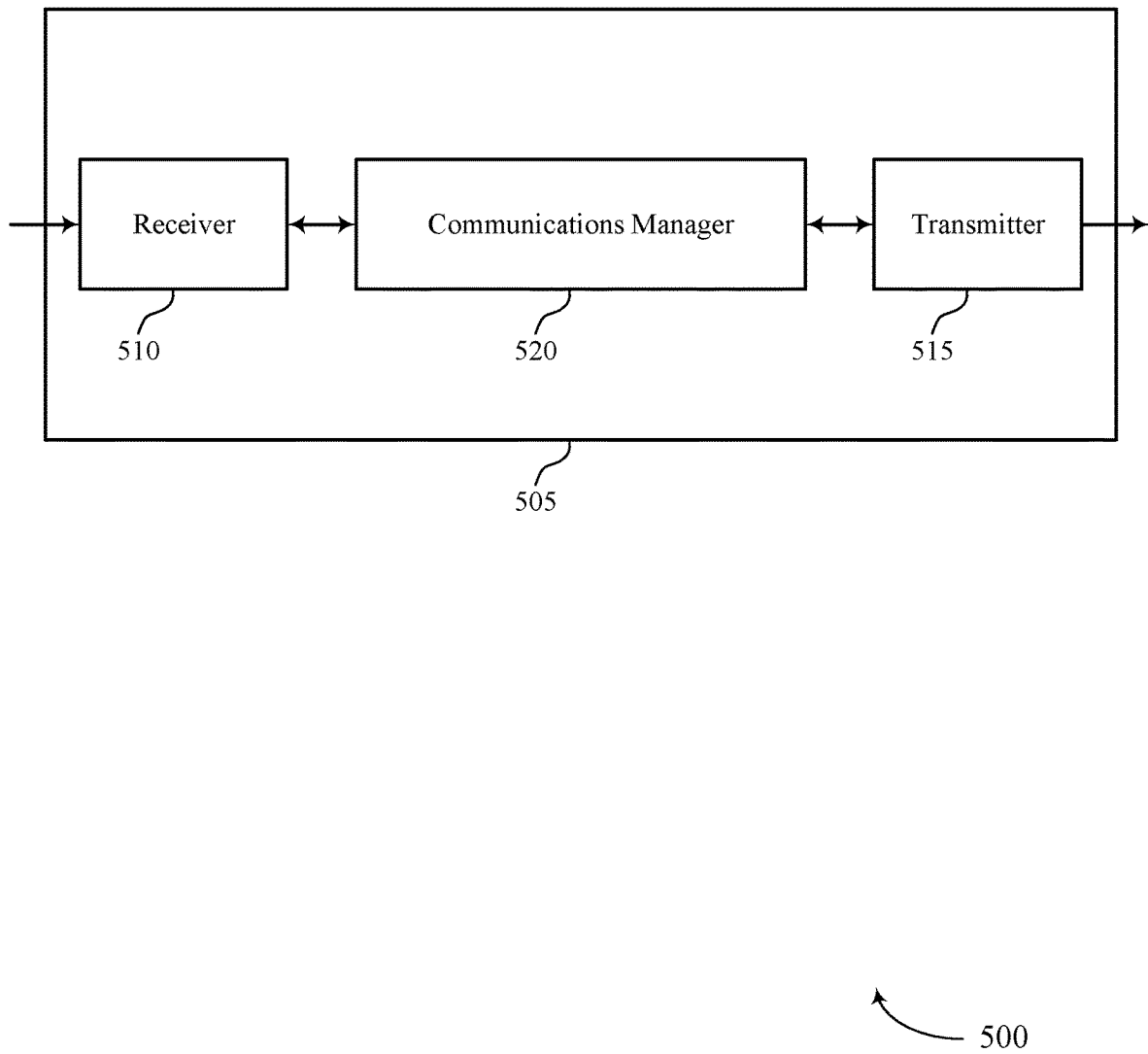
FIGS. 5 and 6 show block diagrams of devices that support improving the performance of coherent uplink MIMO communications in accordance with one or more aspects of the present disclosure.

FIG. 5 shows a block diagram 500 of a device 505 that supports improving the performance of coherent uplink MIMO communications in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to improving the performance of coherent uplink MIMO communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to improving the performance of coherent uplink MIMO communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of improving the performance of coherent uplink MIMO communications as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

For example, the communications manager 520 is capable of, configured to, or operable to support a means for measuring a first amount of reflected power associated with a first antenna of the UE. The communications manager 520 is capable of, configured to, or operable to support a means for measuring a second amount of reflected power associated with a second antenna of the UE. The communications manager 520 is capable of, configured to, or operable to support a means for adjusting an input power for the first antenna based on the first amount of reflected power or the second amount of reflected power. The communications manager 520 is capable of, configured to, or operable to support a means for performing a transmission via the first antenna using the adjusted input power for the first antenna.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for coherent MIMO transmissions using reduced power consumption and increased coherence between antennas, which may lead to reduced amplitude mismatch between transmitted MIMO signals.

Figure 6:
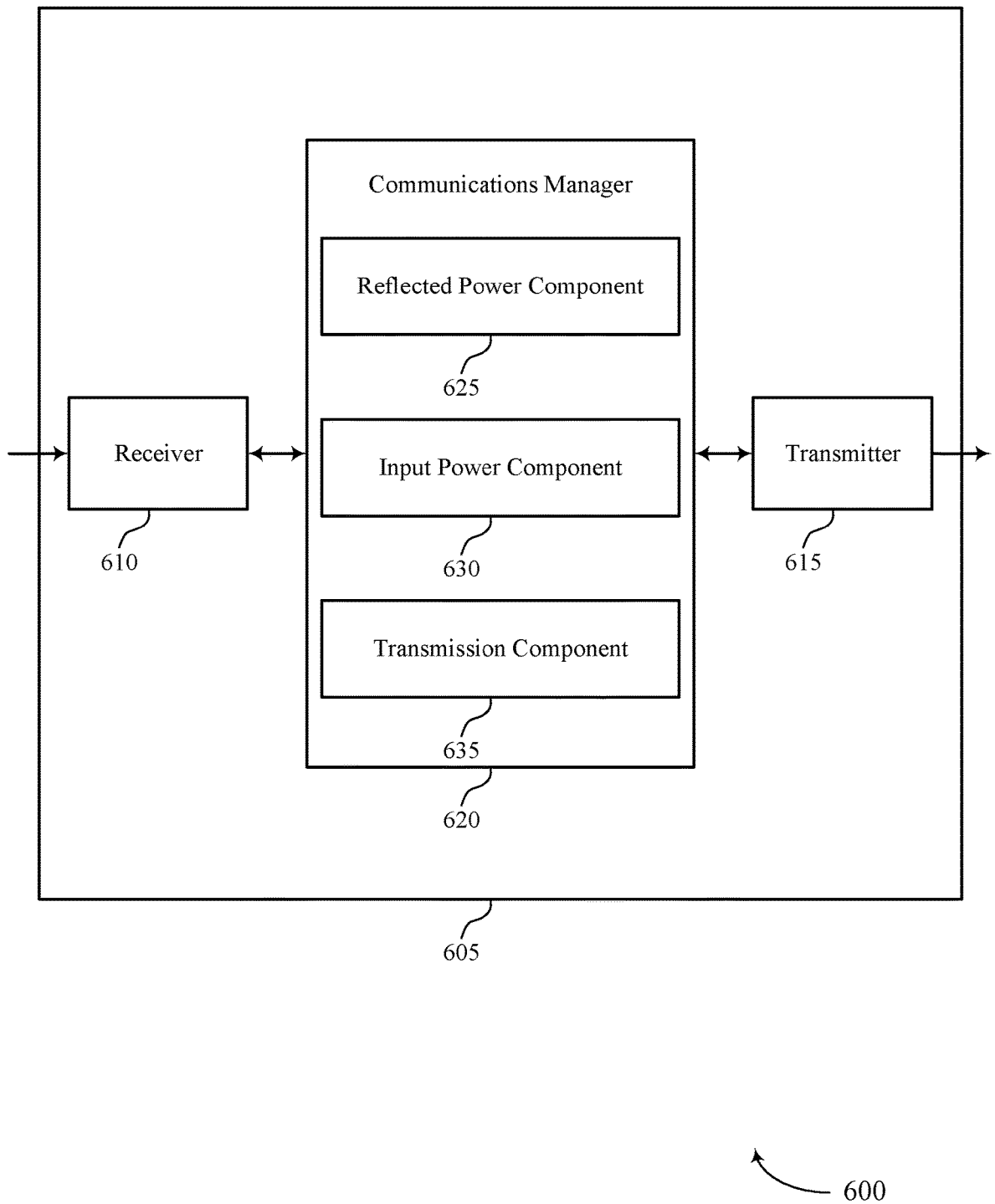

FIG. 6 shows a block diagram 600 of a device 605 that supports improving the performance of coherent uplink MIMO communications in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to improving the performance of coherent uplink MIMO communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to improving the performance of coherent uplink MIMO communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of improving the performance of coherent uplink MIMO communications as described herein. For example, the communications manager 620 may include a reflected power component 625, an input power component 630, a transmission component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The reflected power component 625 is capable of, configured to, or operable to support a means for measuring a first amount of reflected power associated with a first antenna of the UE. The reflected power component 625 is capable of, configured to, or operable to support a means for measuring a second amount of reflected power associated with a second antenna of the UE. The input power component 630 is capable of, configured to, or operable to support a means for adjusting an input power for the first antenna based on the first amount of reflected power or the second amount of reflected power. The transmission component 635 is capable of, configured to, or operable to support a means for performing a transmission via the first antenna using the adjusted input power for the first antenna.

Figure 7:
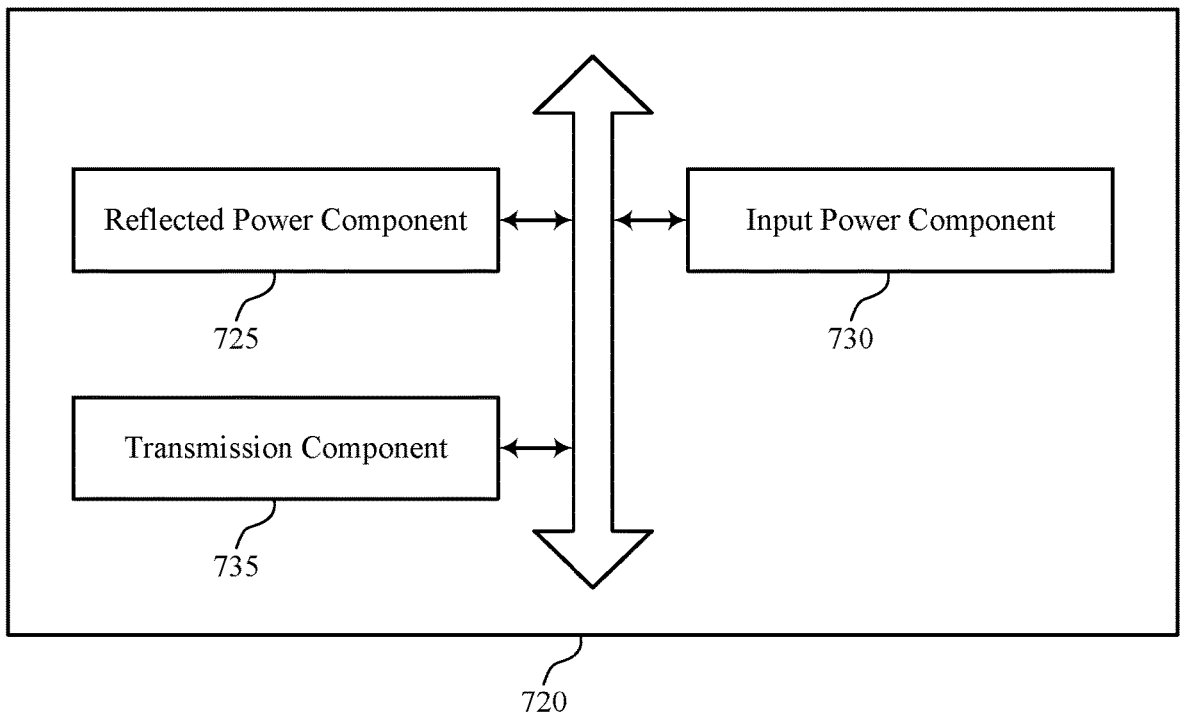
FIG. 7 shows a block diagram of a communications manager that supports improving the performance of coherent uplink MIMO communications in accordance with one or more aspects of the present disclosure.

FIG. 7 shows a block diagram 700 of a communications manager 720 that supports improving the performance of coherent uplink MIMO communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of improving the performance of coherent uplink MIMO communications as described herein. For example, the communications manager 720 may include a reflected power component 725, an input power component 730, a transmission component 735, or any combination thereof. Each of these components, or components or subcomponents thereof (e.g., one or more processors, one or more memories), may communicate, directly or indirectly, with one another (e.g., via one or more buses).

The reflected power component 725 is capable of, configured to, or operable to support a means for measuring a first amount of reflected power associated with a first antenna of the UE. In some examples, the reflected power component 725 is capable of, configured to, or operable to support a means for measuring a second amount of reflected power associated with a second antenna of the UE. The input power component 730 is capable of, configured to, or operable to support a means for adjusting an input power for the first antenna based on the first amount of reflected power or the second amount of reflected power. The transmission component 735 is capable of, configured to, or operable to support a means for performing a transmission via the first antenna using the adjusted input power for the first antenna.

In some examples, to support adjusting the input power for the first antenna, the input power component 730 is capable of, configured to, or operable to support a means for increasing the input power for the first antenna by an amount that is based on the first amount of reflected power.

In some examples, the input power component 730 is capable of, configured to, or operable to support a means for increasing the input power for the second antenna by an amount that is based on the second amount of reflected power.

In some examples, to support performing the transmission, the transmission component 735 is capable of, configured to, or operable to support a means for performing the transmission concurrently via the first antenna and the second antenna based on the increased input power for the first antenna and the increased input power for the second antenna.

In some examples, to support adjusting the input power for the first antenna, the input power component 730 is capable of, configured to, or operable to support a means for decreasing the input power for the first antenna by an amount that is based on the second amount of reflected power.

In some examples, to support decreasing the input power for the first antenna, the input power component 730 is capable of, configured to, or operable to support a means for disabling transmit circuitry coupled with the first antenna. In some examples, decreasing the input power for the first antenna is based on a difference between the first amount of reflected power and the second amount of reflected power satisfying a threshold. In some examples, decreasing the input power for the first antenna is based on a transmission power limit associated with the second antenna.

In some examples, the input power component 730 is capable of, configured to, or operable to support a means for decreasing the input power for the first antenna by at least a first portion of a difference between the first amount of reflected power and the second amount of reflected power. In some examples, the input power component 730 is capable of, configured to, or operable to support a means for increasing the input power for the second antenna by at least a second portion of the difference between the first amount of reflected power and the second amount of reflected power.

In some examples, to support performing the transmission, the transmission component 735 is capable of, configured to, or operable to support a means for performing the transmission concurrently via the first antenna and the second antenna based on the decreased input power for the first antenna and the increased input power for the second antenna. In some examples, adjusting the input power for the first antenna is based on a difference between the first amount of reflected power and the second amount of reflected power.

In some examples, the reflected power component 725 is capable of, configured to, or operable to support a means for periodically measuring an amount of reflected power associated with the first antenna, where measuring the second amount of reflected power is based on periodically measuring the amount of reflective power.

In some examples, the reflected power component 725 is capable of, configured to, or operable to support a means for detecting that a difference between a first periodic measurement of the amount of reflected power associated with the first antenna and a second periodic measurement of the amount of reflected power associated with the first antenna exceeds a threshold, where measuring the second amount of reflected power associated with the second antenna is based on the detecting.

In some examples, the reflected power component 725 is capable of, configured to, or operable to support a means for detecting a change in a position of the UE, a change in a grip type associated with the UE, a change in blockage surrounding the UE, or any combination thereof, based on the periodic measurements of the amount of reflected power associated with the first antenna, where measuring the second amount of reflected power associated with the second antenna is based on detecting the change.

In some examples, to support measuring the first amount of reflected power, the reflected power component 725 is capable of, configured to, or operable to support a means for measuring a first power downstream of a power amplifier of the UE based on a coupler component of the UE operating in a forward position. In some examples, to support measuring the first amount of reflected power, the reflected power component 725 is capable of, configured to, or operable to support a means for measuring a second power associated with reflection of a radiated signal based on the coupler component operating in a reverse position. In some examples, the first amount of reflected power is based on a difference between the first power and the second power.

In some examples, to support performing the transmission, the transmission component 735 is capable of, configured to, or operable to support a means for transmitting concurrently via the first antenna and the second antenna based on the adjusted input power for the first antenna.

Figure 8:
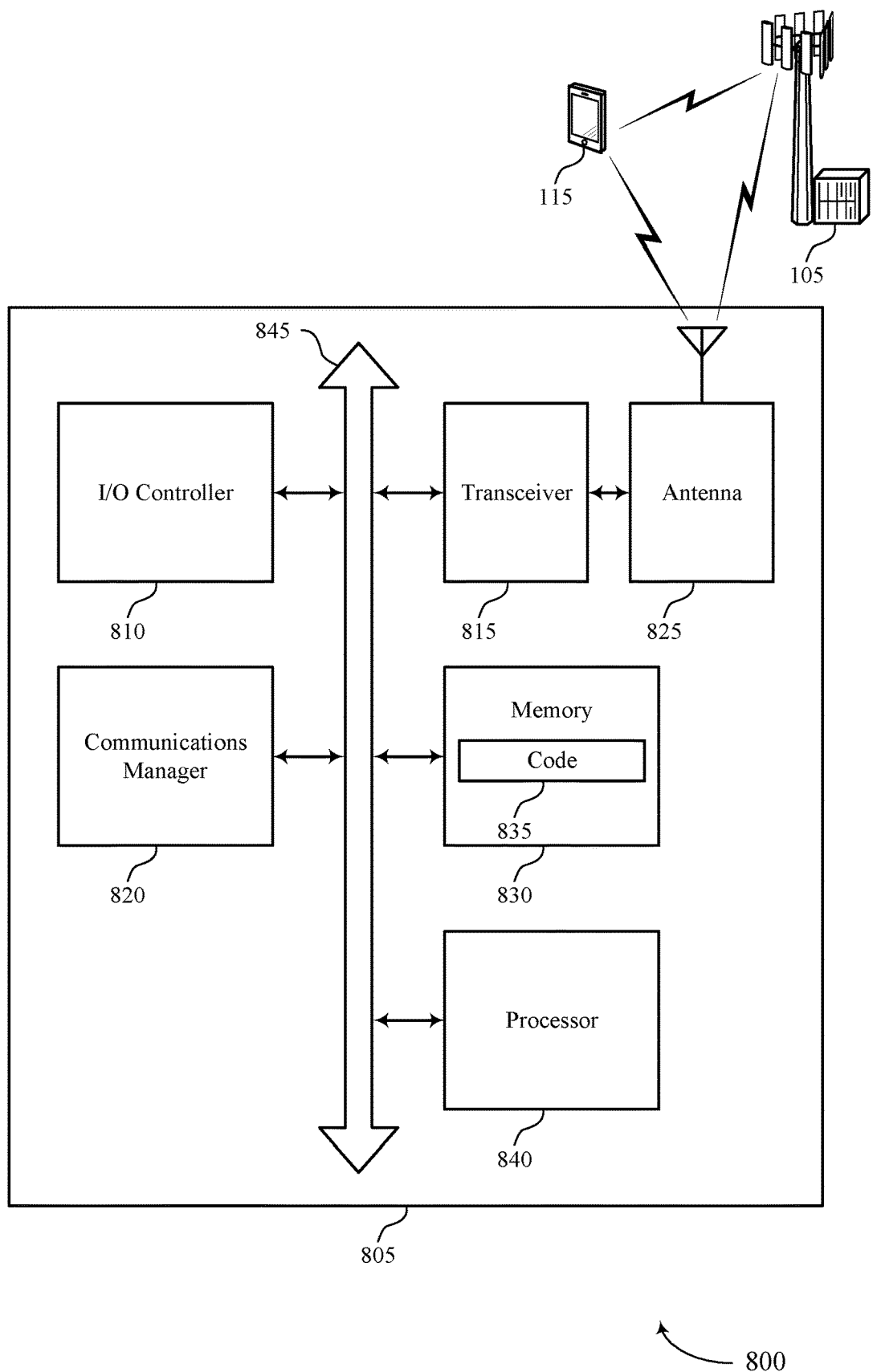
FIG. 8 shows a diagram of a system including a device that supports improving the performance of coherent uplink MIMO communications in accordance with one or more aspects of the present disclosure.

FIG. 8 shows a diagram of a system 800 including a device 805 that supports improving the performance of coherent uplink MIMO communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting improving the performance of coherent uplink MIMO communications). For example, the device 805 or a component of the device 805 may include a processor 840 and memory 830 coupled with or to the processor 840, the processor 840 and memory 830 configured to perform various functions described herein.

For example, the communications manager 820 is capable of, configured to, or operable to support a means for measuring a first amount of reflected power associated with a first antenna of the UE. The communications manager 820 is capable of, configured to, or operable to support a means for measuring a second amount of reflected power associated with a second antenna of the UE. The communications manager 820 is capable of, configured to, or operable to support a means for adjusting an input power for the first antenna based on the first amount of reflected power or the second amount of reflected power. The communications manager 820 is capable of, configured to, or operable to support a means for performing a transmission via the first antenna using the adjusted input power for the first antenna.

By including or configuring the communications manager 820 in accordance with examples as described herein, the device 805 may support techniques for coherent MIMO transmissions using reduced power consumption and increased coherence between antennas, which may lead to reduced amplitude mismatch between transmitted MIMO signals.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of improving the performance of coherent uplink MIMO communications as described herein, or the processor 840 and the memory 830 may be otherwise configured to perform or support such operations.

Figure 9:
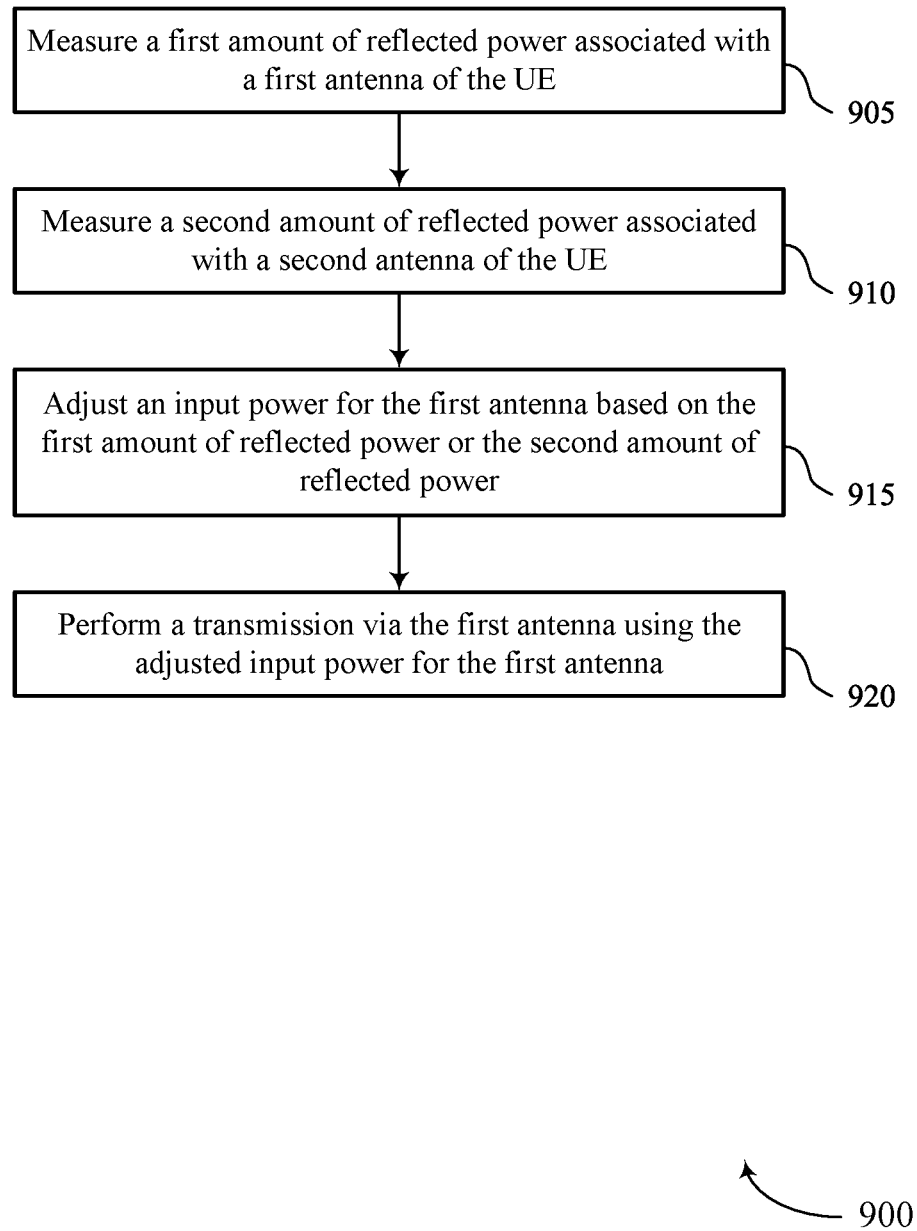
FIGS. 9 and 10 show flowcharts illustrating methods that support improving the performance of coherent uplink MIMO communications in accordance with one or more aspects of the present disclosure.

FIG. 9 shows a flowchart illustrating a method 900 that supports improving the performance of coherent uplink MIMO communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include measuring a first amount of reflected power associated with a first antenna of the UE. The operations of block 905 may be performed in accordance with examples as disclosed herein. In some examples, aspects of the operations of 905 may be performed by a reflected power component 725 as described with reference to FIG. 7.

At 910, the method may include measuring a second amount of reflected power associated with a second antenna of the UE. The operations of block 910 may be performed in accordance with examples as disclosed herein. In some examples, aspects of the operations of 910 may be performed by a reflected power component 725 as described with reference to FIG. 7.

At 915, the method may include adjusting an input power for the first antenna based on the first amount of reflected power or the second amount of reflected power. The operations of block 915 may be performed in accordance with examples as disclosed herein. In some examples, aspects of the operations of 915 may be performed by an input power component 730 as described with reference to FIG. 7.

At 920, the method may include performing a transmission via the first antenna using the adjusted input power for the first antenna. The operations of block 920 may be performed in accordance with examples as disclosed herein. In some examples, aspects of the operations of 920 may be performed by a transmission component 735 as described with reference to FIG. 7.

Figure 10:
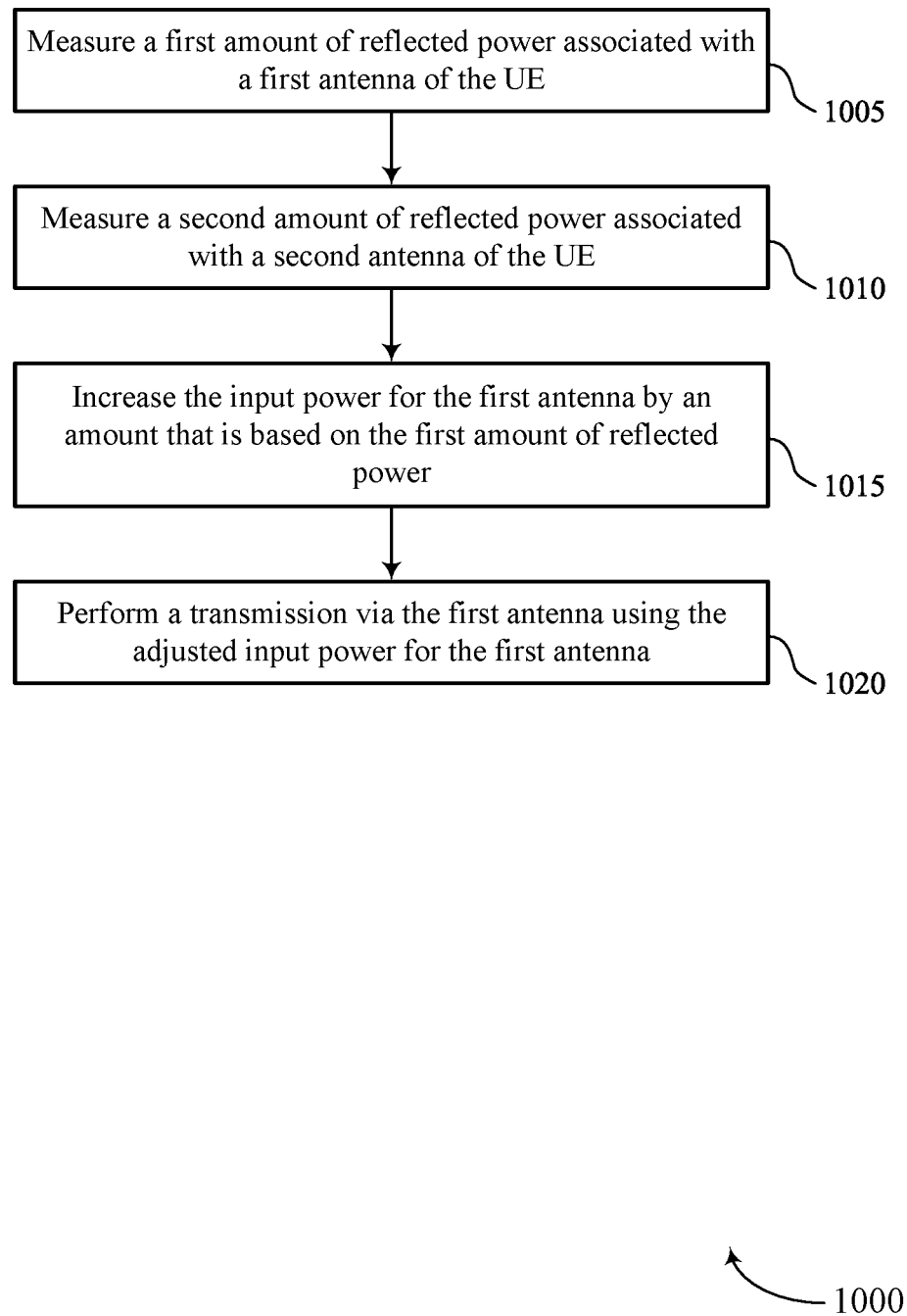

FIG. 10 shows a flowchart illustrating a method 1000 that supports improving the performance of coherent uplink MIMO communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include measuring a first amount of reflected power associated with a first antenna of the UE. The operations of block 1005 may be performed in accordance with examples as disclosed herein. In some examples, aspects of the operations of 1005 may be performed by a reflected power component 725 as described with reference to FIG. 7.

At 1010, the method may include measuring a second amount of reflected power associated with a second antenna of the UE. The operations of block 1010 may be performed in accordance with examples as disclosed herein. In some examples, aspects of the operations of 1010 may be performed by a reflected power component 725 as described with reference to FIG. 7.

At 1015, the method may include increasing the input power for the first antenna by an amount that is based on the first amount of reflected power. The operations of block 1015 may be performed in accordance with examples as disclosed herein. In some examples, aspects of the operations of 1015 may be performed by an input power component 730 as described with reference to FIG. 7.

At 1020, the method may include performing a transmission via the first antenna using the adjusted input power for the first antenna. The operations of block 1020 may be performed in accordance with examples as disclosed herein. In some examples, aspects of the operations of 1020 may be performed by a transmission component 735 as described with reference to FIG. 7.

The following provides an overview of aspects of the present disclosure:

Aspect 1: A method for wireless communication by a UE, comprising: measuring a first amount of reflected power associated with a first antenna of the UE; measuring a second amount of reflected power associated with a second antenna of the UE; adjusting an input power for the first antenna based at least in part on the first amount of reflected power or the second amount of reflected power; and performing a transmission via the first antenna using the adjusted input power for the first antenna.

Aspect 2: The method of aspect 1, wherein adjusting the input power for the first antenna comprises: increasing the input power for the first antenna by an amount that is based at least in part on the first amount of reflected power.

Aspect 3: The method of aspect 2, further comprising: increasing the input power for the second antenna by an amount that is based at least in part on the second amount of reflected power.

Aspect 4: The method of aspect 3, wherein performing the transmission comprises: performing the transmission concurrently via the first antenna and the second antenna based at least in part on the increased input power for the first antenna and the increased input power for the second antenna.

Aspect 5: The method of aspect 1, wherein adjusting the input power for the first antenna comprises: decreasing the input power for the first antenna by an amount that is based at least in part on the second amount of reflected power.

Aspect 6: The method of aspect 5, wherein decreasing the input power for the first antenna comprises disabling transmit circuitry coupled with the first antenna.

Aspect 7: The method of any of aspects 5 through 6, wherein decreasing the input power for the first antenna is based at least in part on a difference between the first amount of reflected power and the second amount of reflected power satisfying a threshold.

Aspect 8: The method of any of aspects 5 through 7, wherein decreasing the input power for the first antenna is based at least in part on a transmission power limit associated with the second antenna.

Aspect 9: The method of aspect 8, further comprising: decreasing the input power for the first antenna by at least a first portion of a difference between the first amount of reflected power and the second amount of reflected power; and increasing the input power for the second antenna by at least a second portion of the difference between the first amount of reflected power and the second amount of reflected power.

Aspect 10: The method of aspect 9, wherein performing the transmission comprises: performing the transmission concurrently via the first antenna and the second antenna based at least in part on the decreased input power for the first antenna and the increased input power for the second antenna.

Aspect 11: The method of any of aspects 1 through 10, wherein adjusting the input power for the first antenna is based at least in part on a difference between the first amount of reflected power and the second amount of reflected power.

Aspect 12: The method of any of aspects 1 through 11, further comprising: periodically measuring an amount of reflected power associated with the first antenna, wherein measuring the second amount of reflected power is based at least in part on periodically measuring the amount of reflective power.

Aspect 13: The method of aspect 12, further comprising: detect that a difference between a first periodic measurement of the amount of reflected power associated with the first antenna and a second periodic measurement of the amount of reflected power associated with the first antenna exceeds a threshold, wherein measuring the second amount of reflected power associated with the second antenna is based at least in part on the detecting.

Aspect 14: The method of any of aspects 12 through 13, further comprising: detecting a change in a position of the UE, a change in a grip type associated with the UE, a change in blockage surrounding the UE, or any combination thereof, based at least in part on the periodic measurements of the amount of reflected power associated with the first antenna, wherein measuring the second amount of reflected power associated with the second antenna is based at least in part on detecting the change.

Aspect 15: The UE of any of aspects 1 through 14, wherein measuring the first amount of reflected power further comprises: measuring a first power downstream of a power amplifier of the UE based at least in part on a coupler component of the UE operating in a forward position; and measuring a second power associated with reflection of a radiated signal based at least in part on the coupler component operating in a reverse position.

Aspect 16: The UE of aspect 15, wherein the first amount of reflected power is based at least in part on a difference between the first power and the second power.

Aspect 17: The UE of any of aspects 1 through 16, wherein performing the transmission further comprises: transmitting concurrently via the first antenna and the second antenna based at least in part on the adjusted input power for the first antenna.

Aspect 18: A UE for wireless communication, comprising one or more memories storing processor-executable code, and one or more processors coupled with the one or more memories and individually or collectively operable to execute the code to cause the UE to perform a method of any of aspects 1 through 17.

Aspect 19: A UE for wireless communication, comprising at least one means for performing a method of any of aspects 1 through 17.

Aspect 20: A non-transitory computer-readable medium storing code for wireless communication, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
   one or more processors;
   one or more memories coupled with the one or more processors; and
   instructions stored in the one or more memories and executable by the one or more processors to cause the UE to:
      measure a first amount of reflected power and a second amount of reflected power associated with a first antenna of the UE, the first amount of reflected power being based at least in part on a first reflection internal to the UE and the second amount of reflected power being based at least in part on a second reflection internal to the UE;
      measure, based at least in part on a difference between the first amount of reflected power and the second amount of reflected power satisfying a threshold, a third amount of reflected power associated with a second antenna of the UE, the third amount of reflected power being based at least in part on a third reflection internal to the UE;
      adjust an input power for the first antenna based at least in part on the first amount of reflected power, the second amount of reflected power, or the third amount of reflected power; and
      perform a transmission via the first antenna using the adjusted input power for the first antenna.

2. The UE of claim 1, wherein, to adjust the input power for the first antenna, the instructions are executable by the one or more processors to cause the UE to:
   increase the input power for the first antenna by an amount that is based at least in part on the second amount of reflected power.

3. The UE of claim 2, wherein the instructions are further executable by the one or more processors to cause the UE to:
   increase the input power for the second antenna by an amount that is based at least in part on the third amount of reflected power.

4. The UE of claim 3, wherein, to perform the transmission, the instructions are executable by the one or more processors to cause the UE to:
   perform the transmission concurrently via the first antenna and the second antenna based at least in part on the increased input power for the first antenna and the increased input power for the second antenna.

5. The UE of claim 1, wherein, to adjust the input power for the first antenna, the instructions are executable by the one or more processors to cause the UE to:
decrease the input power for the first antenna by an amount that is based at least in part on the third amount of reflected power.

6. The UE of claim 5, wherein, to decrease the input power for the first antenna, the instructions are executable by the one or more processors to cause the UE to:
disable transmit circuitry coupled with the first antenna.

7. The UE of claim 5, wherein the instructions are executable by the one or more processors to cause the UE to decrease the input power for the first antenna based at least in part on a second difference between the second amount of reflected power and the third amount of reflected power satisfying a second threshold.

8. The UE of claim 5, wherein the instructions are executable by the one or more processors to cause the UE to decrease the input power for the first antenna based at least in part on a transmission power limit associated with the second antenna.

9. The UE of claim 8, wherein the instructions are further executable by the one or more processors to cause the UE to:
decrease the input power for the first antenna by at least a first portion of a second difference between the second amount of reflected power and the third amount of reflected power; and
increase the input power for the second antenna by at least a second portion of the second difference between the second amount of reflected power and the third amount of reflected power.

10. The UE of claim 9, wherein, to perform the transmission, the instructions are executable by the one or more processors to cause the UE to:
perform the transmission concurrently via the first antenna and the second antenna based at least in part on the decreased input power for the first antenna and the increased input power for the second antenna.

11. The UE of claim 1, wherein the instructions are executable by the one or more processors to cause the UE to adjust the input power for the first antenna based at least in part on a second difference between the second amount of reflected power and the third amount of reflected power.

12. The UE of claim 1, wherein the instructions are further executable by the one or more processors to cause the UE to:
periodically measure an amount of reflected power associated with the first antenna, wherein measuring the third amount of reflected power is based at least in part on periodically measuring the amount of reflective power.

13. The UE of claim 12, wherein the instructions are further executable by the one or more processors to cause the UE to:
detect that the difference between a first periodic measurement of the first amount of reflected power associated with the first antenna and a second periodic measurement of the second amount of reflected power associated with the first antenna exceeds the threshold, wherein measuring the third amount of reflected power associated with the second antenna is based at least in part on the detecting.

14. The UE of claim 12, wherein the instructions are further executable by the one or more processors to cause the UE to:
detect a change in a position of the UE, a change in a grip type associated with the UE, a change in blockage surrounding the UE, or any combination thereof, based at least in part on the periodic measurements of the amount of reflected power associated with the first antenna, wherein measuring the third amount of reflected power associated with the second antenna is based at least in part on detecting the change.

15. The UE of claim 1, wherein, to measure the second amount of reflected power, the instructions are executable by the one or more processors to cause the UE to:
measure a first power downstream of a power amplifier of the UE based at least in part on a coupler component of the UE operating in a forward position; and
measure a second power associated with reflection of a radiated signal based at least in part on the coupler component operating in a reverse position.

16. The UE of claim 15, wherein the second amount of reflected power is based at least in part on a difference between the first power and the second power.

17. The UE of claim 1, wherein, to perform the transmission, the instructions are executable by the one or more processors to cause the UE to:
transmit concurrently via the first antenna and the second antenna based at least in part on the adjusted input power for the first antenna.

18. The UE of claim 1, wherein the instructions are executable by the one or more processors to cause the UE to:
calculate the first amount of reflected power, the second amount of reflected power, and the third amount of reflected power in accordance with a respective voltage standing wave ratio calculation.

19. A method for wireless communication by a user equipment (UE), comprising:
measuring a first amount of reflected power and a second amount of reflected power associated with a first antenna of the UE, the first amount of reflected power being based at least in part on a first reflection internal to the UE and the second amount of reflected power being based at least in part on a second reflection internal to the UE;
measuring, based at least in part on a difference between the first amount of reflected power and the second amount of reflected power satisfying a threshold, a third amount of reflected power associated with a second antenna of the UE, the third amount of reflected power being based at least in part on a third reflection internal to the UE;
adjusting an input power for the first antenna based at least in part on the first amount of reflected power, the second amount of reflected power, or the third amount of reflected power; and
performing a transmission via the first antenna using the adjusted input power for the first antenna.

20. The method of claim 19, wherein adjusting the input power for the first antenna comprises:
increasing the input power for the first antenna by an amount that is based at least in part on the second amount of reflected power.

21. The method of claim 20, further comprising:
increasing the input power for the second antenna by an amount that is based at least in part on the third amount of reflected power.

22. The method of claim 21, wherein performing the transmission comprises:
performing the transmission concurrently via the first antenna and the second antenna based at least in part on the increased input power for the first antenna and the increased input power for the second antenna.

23. The method of claim 19, wherein adjusting the input power for the first antenna comprises:
decreasing the input power for the first antenna by an amount that is based at least in part on the third amount of reflected power.

24. The method of claim 23, wherein decreasing the input power for the first antenna comprises disabling transmit circuitry coupled with the first antenna.

25. The method of claim 23, wherein decreasing the input power for the first antenna is based at least in part on a second difference between the second amount of reflected power and the third amount of reflected power satisfying a second threshold.

26. The method of claim 23, wherein decreasing the input power for the first antenna is based at least in part on a transmission power limit associated with the second antenna.

27. The method of claim 26, further comprising:
decreasing the input power for the first antenna by at least a first portion of a second difference between the second amount of reflected power and the third amount of reflected power; and
increasing the input power for the second antenna by at least a second portion of the second difference between the second amount of reflected power and the third amount of reflected power.

28. The method of claim 27, wherein performing the transmission comprises:
performing the transmission concurrently via the first antenna and the second antenna based at least in part on the decreased input power for the first antenna and the increased input power for the second antenna.

29. A user equipment (UE) for wireless communication, comprising:
means for measuring a first amount of reflected power and a second amount of reflected power associated with a first antenna of the UE, the first amount of reflected power being based at least in part on a first reflection internal to the UE and the second amount of reflected power being based at least in part on a second reflection internal to the UE;
means for measuring, based at least in part on a difference between the first amount of reflected power and the second amount of reflected power satisfying a threshold, a third amount of reflected power associated with a second antenna of the UE, the third amount of reflected power being based at least in part on a third reflection internal to the UE;
means for adjusting an input power for the first antenna based at least in part on the first amount of reflected power, the second amount of reflected power, or the third amount of reflected power; and
means for performing a transmission via the first antenna using the adjusted input power for the first antenna.

30. A non-transitory computer-readable medium storing code, the code comprising instructions executable by one or more processors to:
measure a first amount of reflected power and a second amount of reflected power associated with a first antenna of a user equipment (UE), the first amount of reflected power being based at least in part on a first reflection internal to the UE and the second amount of reflected power being based at least in part on a second reflection internal to the UE;
measure, based at least in part on a difference between the first amount of reflected power and the second amount of reflected power satisfying a threshold, a third amount of reflected power associated with a second antenna of the UE, the third amount of reflected power being based at least in part on a third reflection internal to the UE;
adjust an input power for the first antenna based at least in part on the first amount of reflected power, the second amount of reflected power, or the third amount of reflected power; and
perform a transmission via the first antenna using the adjusted input power for the first antenna.

* * * * *